United States Patent
Perry et al.

(10) Patent No.: US 6,917,369 B2
(45) Date of Patent: Jul. 12, 2005

(54) METHOD AND APPARATUS FOR RENDERING CELL-BASED DISTANCE FIELDS USING TEXTURE MAPPING

(75) Inventors: Ronald N. Perry, Cambridge, MA (US); Sarah F. Frisken, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 0 days.

(21) Appl. No.: 10/802,482

(22) Filed: Mar. 16, 2004

(65) Prior Publication Data

US 2004/0189655 A1 Sep. 30, 2004

Related U.S. Application Data

(63) Continuation-in-part of application No. 10/396,861, filed on Mar. 25, 2003.

(51) Int. Cl.$^7$ ................................................. G09G 5/02
(52) U.S. Cl. ........................ 345/589; 345/420; 345/611
(58) Field of Search ................................ 345/582, 586, 345/587, 589, 606, 420

(56) References Cited

U.S. PATENT DOCUMENTS

| | | | | |
|---|---|---|---|---|
| 5,542,036 A | * | 7/1996 | Schroeder et al. | 345/424 |
| 5,875,040 A | * | 2/1999 | Matraszek et al. | 358/453 |
| 5,982,387 A | * | 11/1999 | Hellmann | 345/469 |
| 6,037,949 A | * | 3/2000 | DeRose et al. | 345/582 |
| 6,188,385 B1 | | 2/2001 | Hill et al. | 345/136 |
| 6,329,977 B1 | * | 12/2001 | McNamara et al. | 345/589 |
| 6,377,262 B1 | * | 4/2002 | Hitchcock et al. | 345/467 |
| 6,396,492 B1 | | 5/2002 | Frisken et al. | 345/420 |
| 6,603,484 B1 | * | 8/2003 | Frisken et al. | 345/622 |
| 6,721,446 B1 | * | 4/2004 | Wilensky et al. | 382/162 |
| 6,741,246 B2 | * | 5/2004 | Perry et al. | 345/420 |
| 2002/0097912 A1 | * | 7/2002 | Kimmel et al. | 382/199 |

OTHER PUBLICATIONS

Frisken, S. et al., "Adaptively Sampled Distance Fields: A General Representation of Shape for Computer Graphics," SIGGRAPH 2000, pp 249–254.*

Jeng, E.K.–Y.; Xiang, Z.; "Fast Soft Shadow Visualization for Deformable Moving Light Sources Using Adaptively Sampled Light Field Shadow Maps;" Proceedings of the 10th Pacific Conference on Computer Graphics and Applications (PG'02); 2002.*

Russ, J.C., "The Image Processing Handbook," CRC Press LLC, 2002, pp 425–429.*

(Continued)

Primary Examiner—Matthew C. Bella
Assistant Examiner—Alysa N. Brautigam
(74) Attorney, Agent, or Firm—Dirk Brinkman; Andrew J. Curtin

(57) ABSTRACT

A method and apparatus render a region of a distance field representing an object. The distance field is partitioned into a set of cells, where each cell includes a set of distance samples and a method for reconstructing the distance field within the cell using the distance samples. A set of source cells is selected from the set of cells of the distance field to enable the rendering of the region. Each source cell is represented as a geometric element in a world coordinate system. Each geometric element is associated with a texture map, where the texture map includes distance samples of the corresponding source cell of the geometric element. Each geometric element is transformed from the world coordinate system to a pixel coordinate system and texture mapped, using the distance samples, to determine a distance for each component of each pixel associated with the geometric element. The distance of each component of each pixel is mapped to an antialiased intensity of the component of the pixel.

45 Claims, 27 Drawing Sheets

OTHER PUBLICATIONS

Crawfis, R.A.; Max, N.; "Texture Splats for 3D Scalar and Vector Field Visualization," Proceedings of IEEE Visualization '93, 1993, pp. 261–265.*

ACM Search Report.*

Hersch et al., "Perceptually Tuned Generation of Grayscale Fonts," IEEE CG&A, Nov., pp. 78–89, 1995.

Perry, et al., "Kizamu: A System for Sculpting Digital Characters," Proceedings ACM SIGGRAPH 2001, pp. 47–56, 2001.

Frisken, et al., "Adaptively Sampled Distance Fields: a General Representation of Shape for Computer Graphics," Proceedings ACM SIGGRAPH 2000, pp. 249–254, 2000.

Sederberg, et al., "Geometric Hermite Approximation of Surface Patch Intersection Curves," CAGD, 8 (2), pp. 97–114, 1991.

Platt, in "Optimal Filtering for Patterned Displays," IEEE Signal Processing Letters, 7 (7), pp. 179–180, 2000.

Hoff, et al., "Fast and Simple 2D Geometric Proximity Queries Using Graphics Hardware," Proc. Interactive 3D Graphics'01, 2001.

* cited by examiner

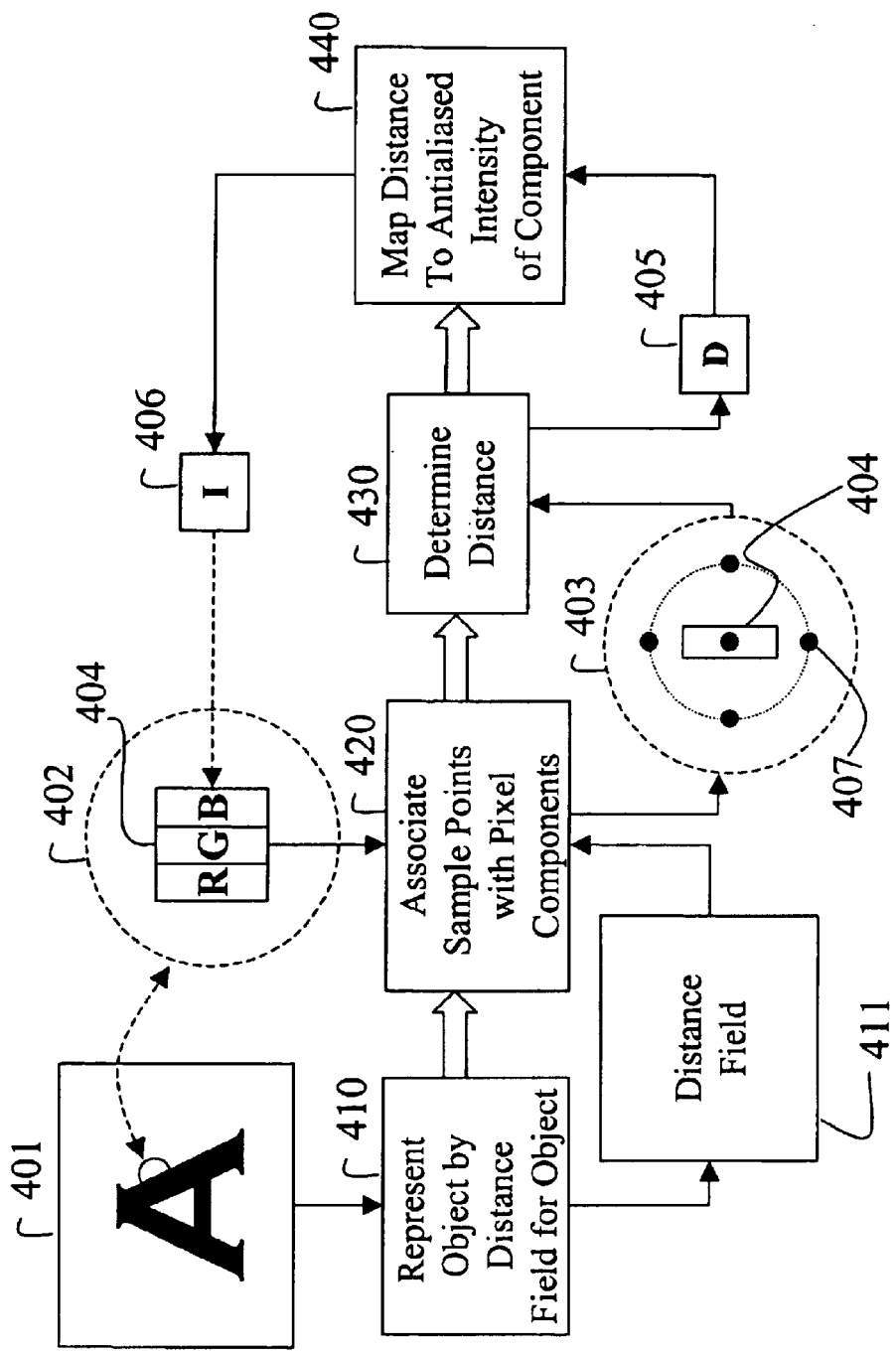

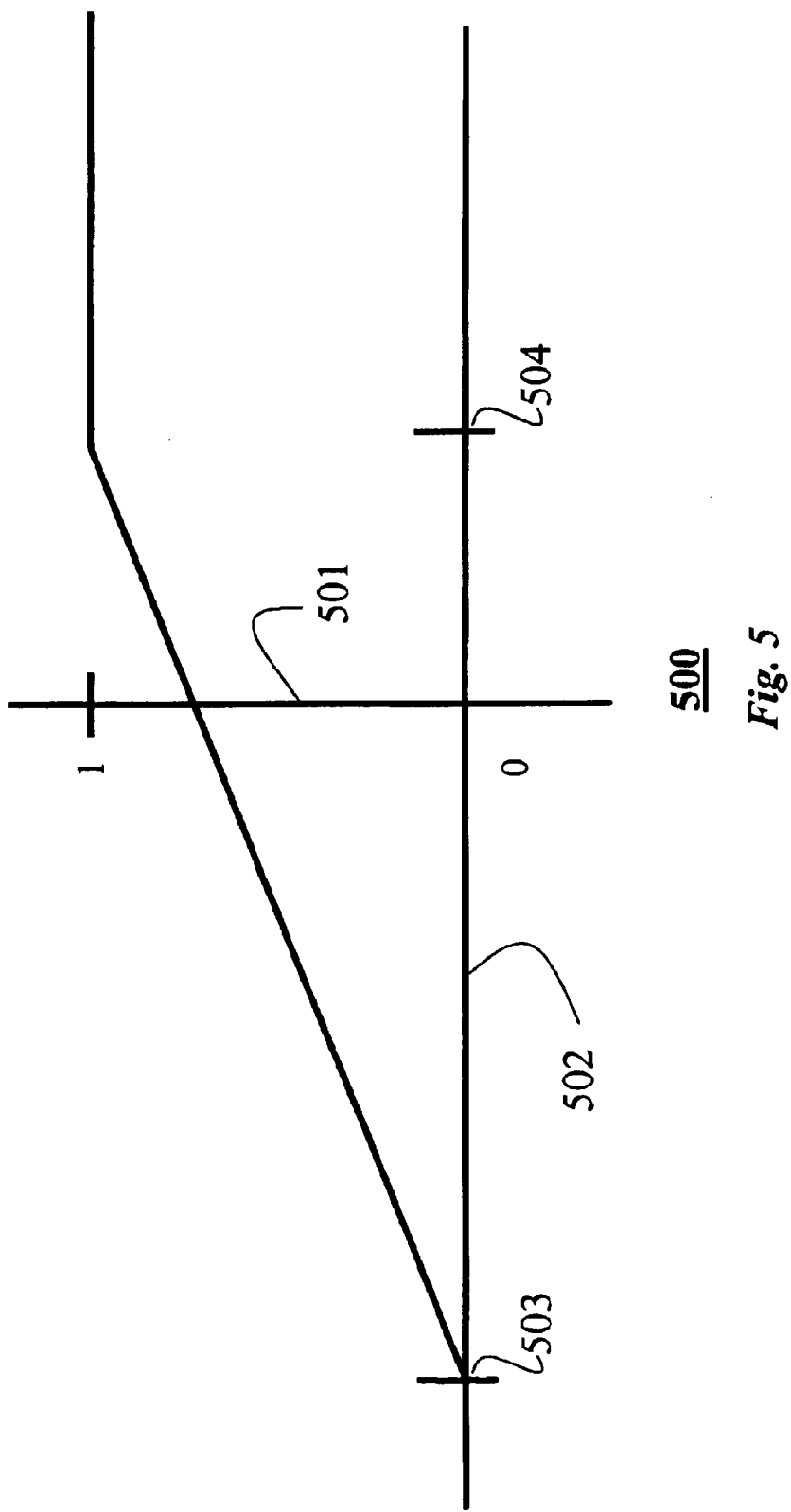

1300

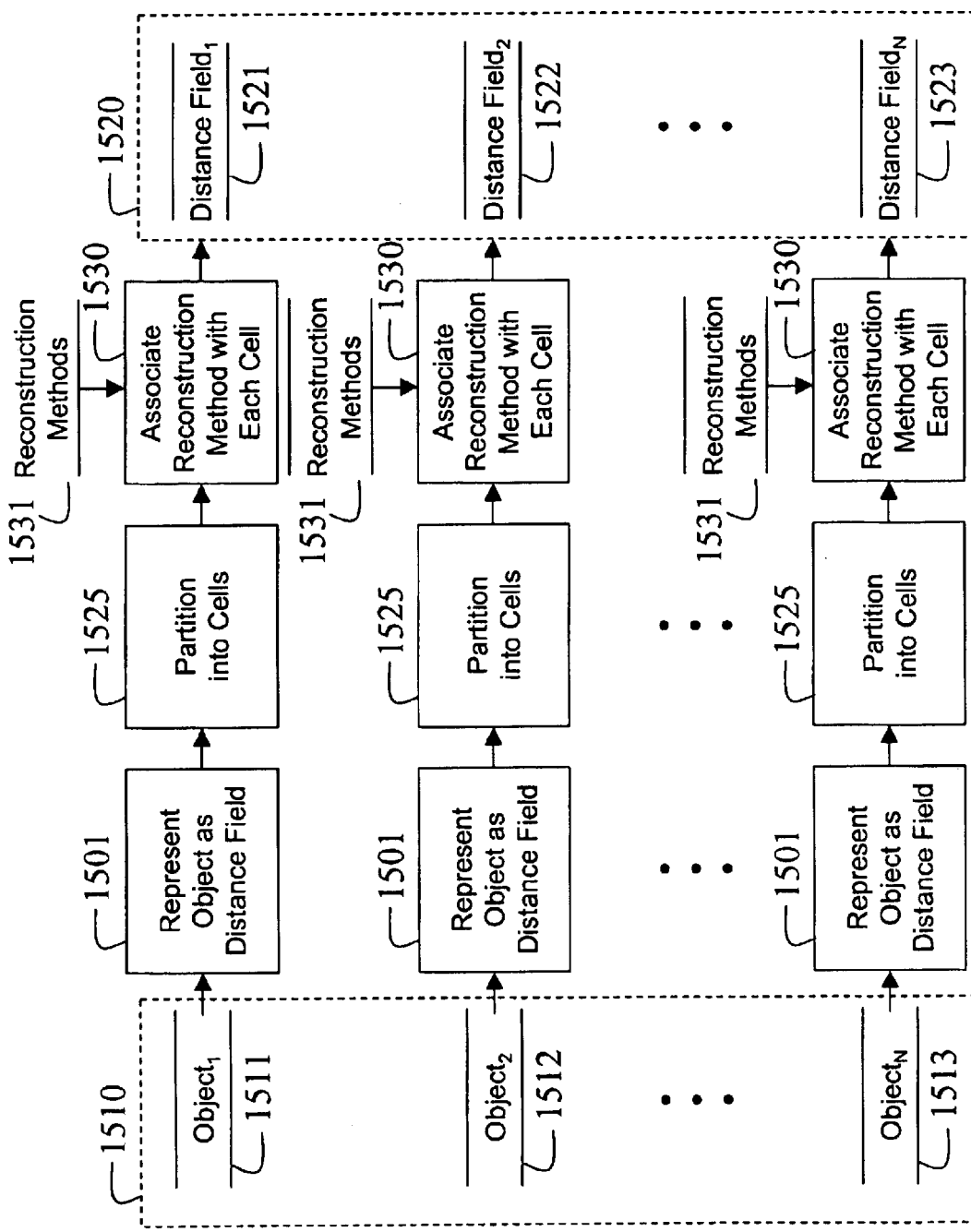

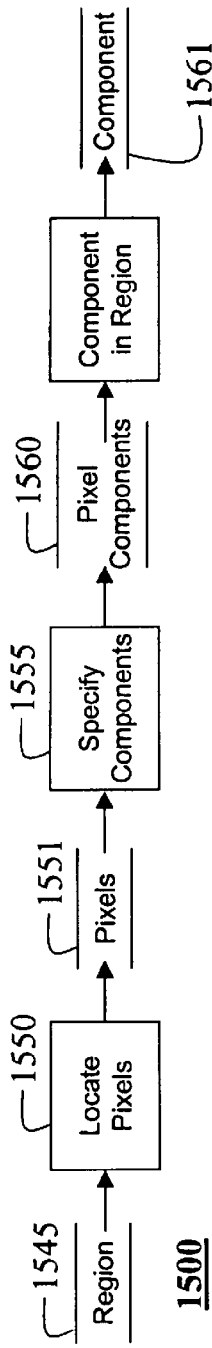
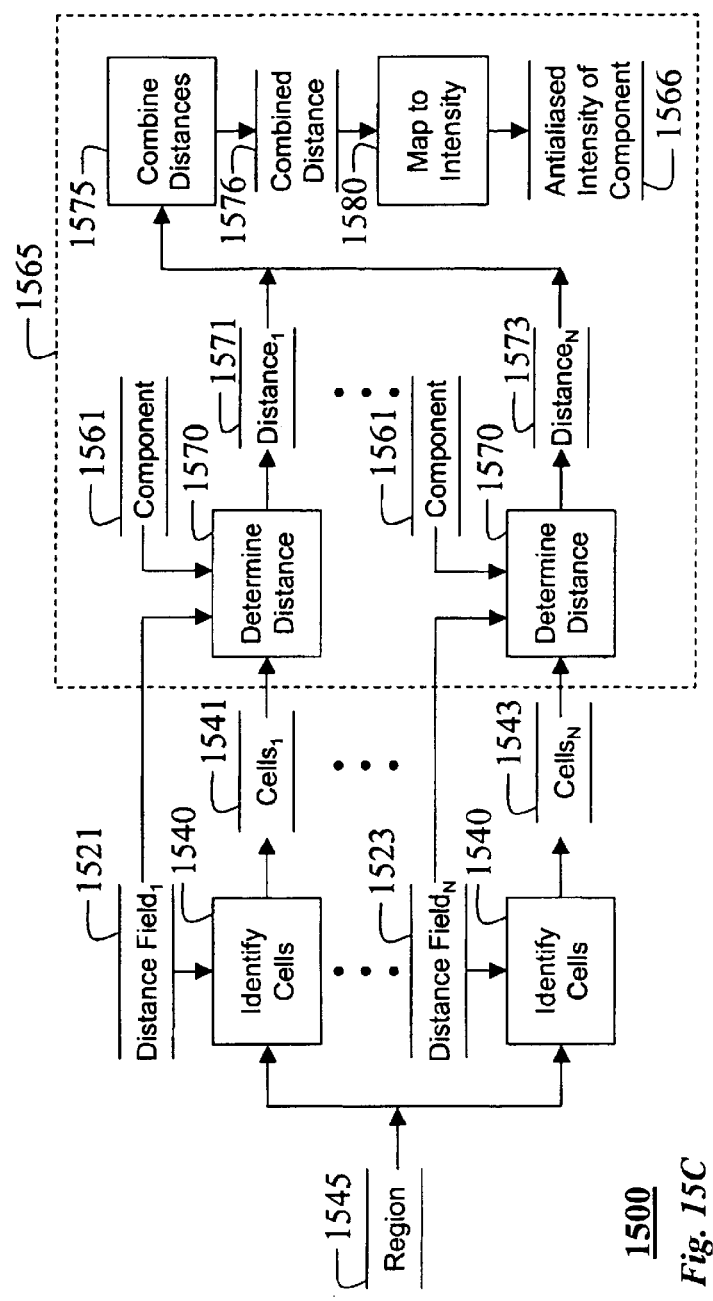

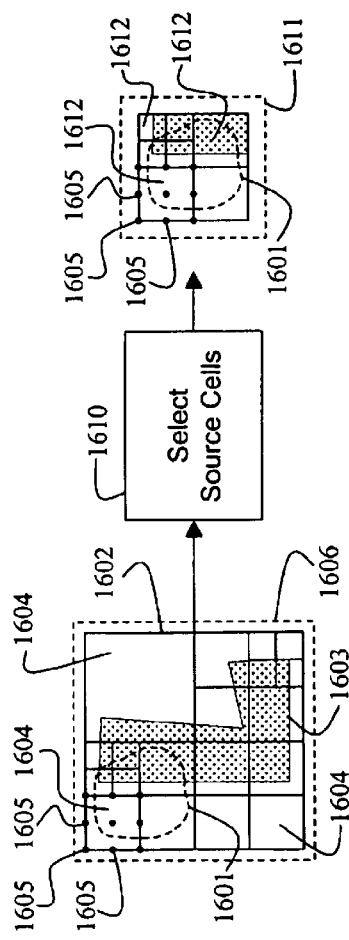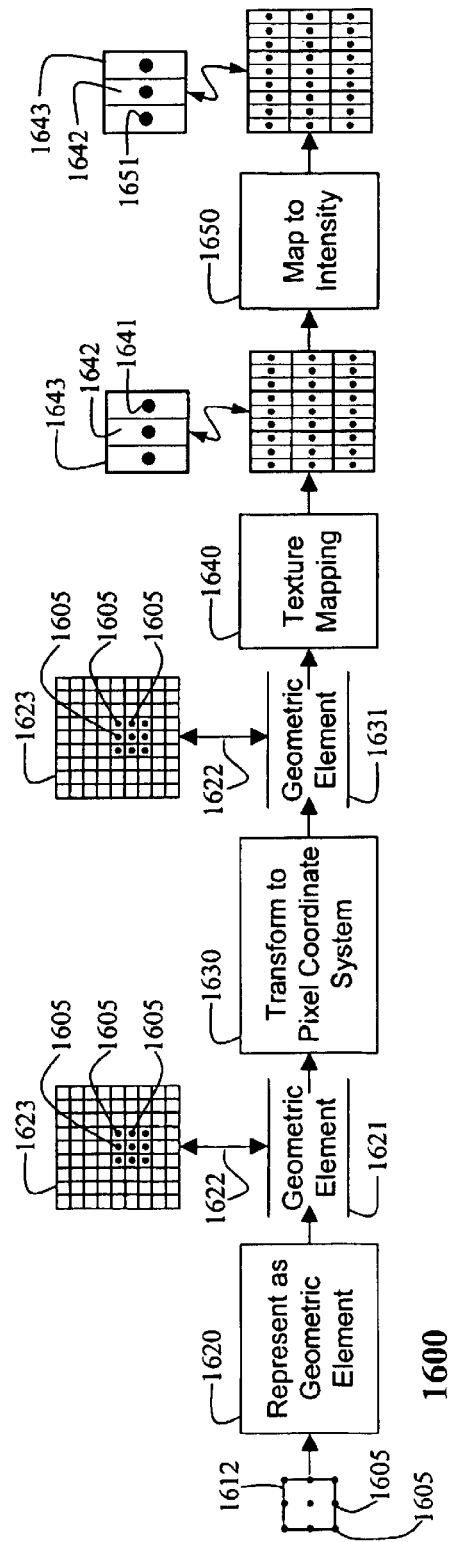

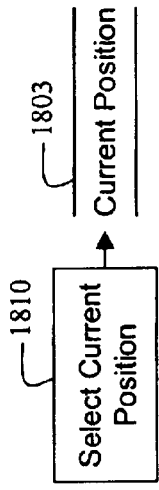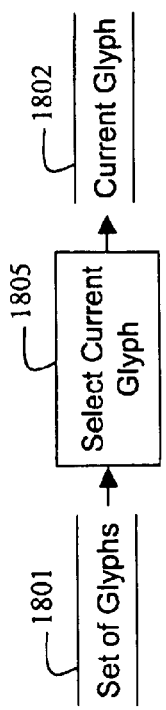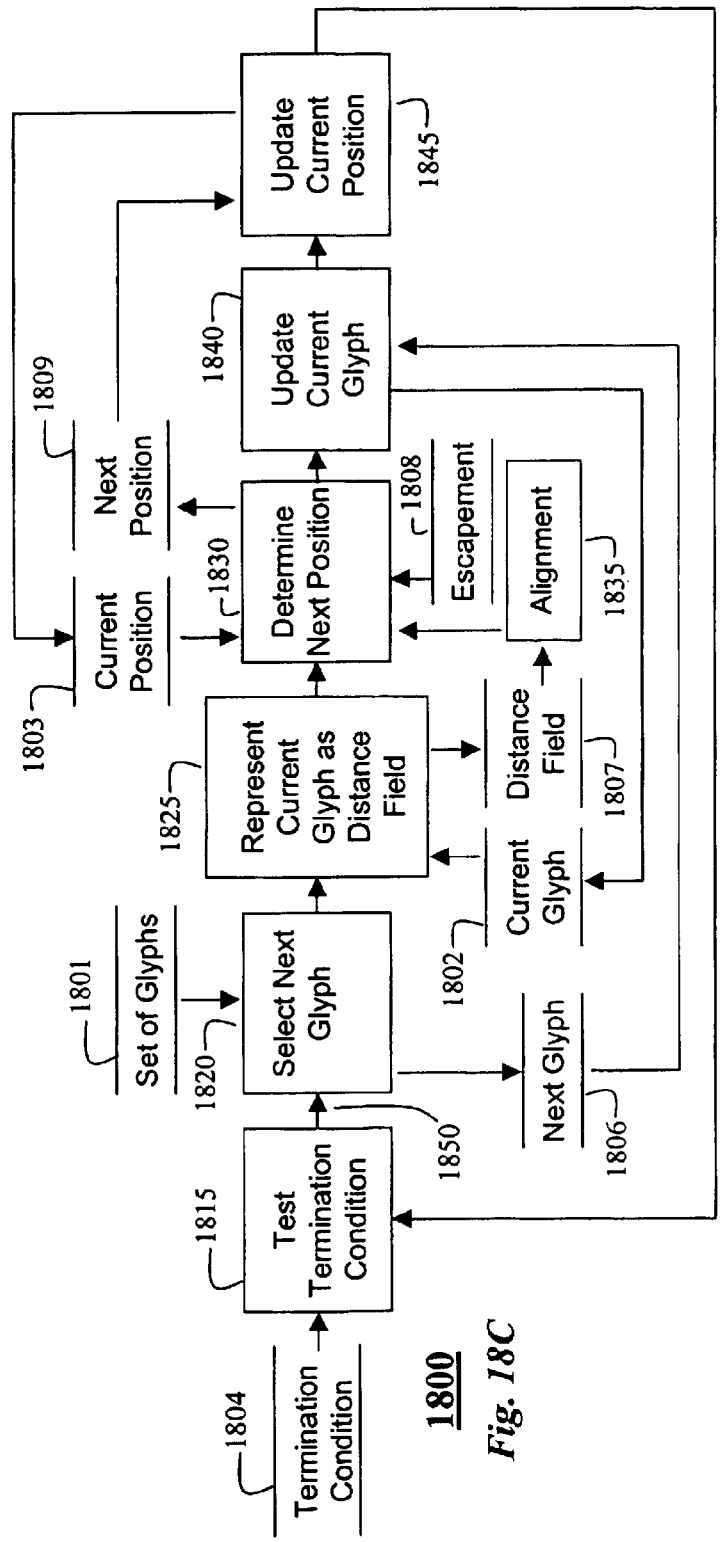
Fig. 18B
Fig. 18A
Fig. 18C

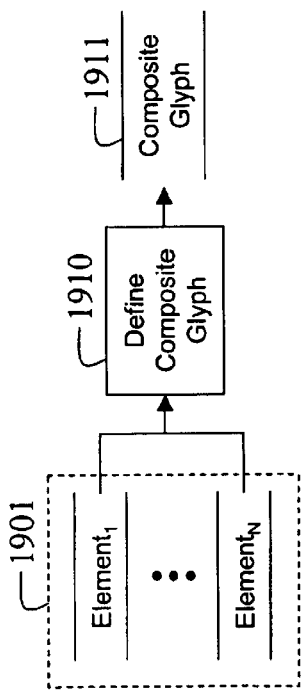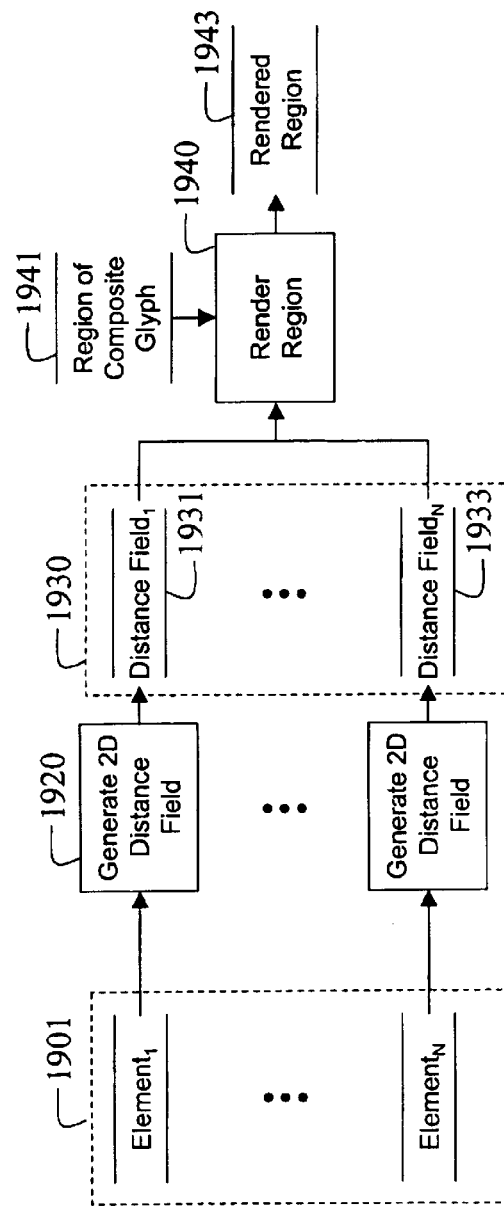

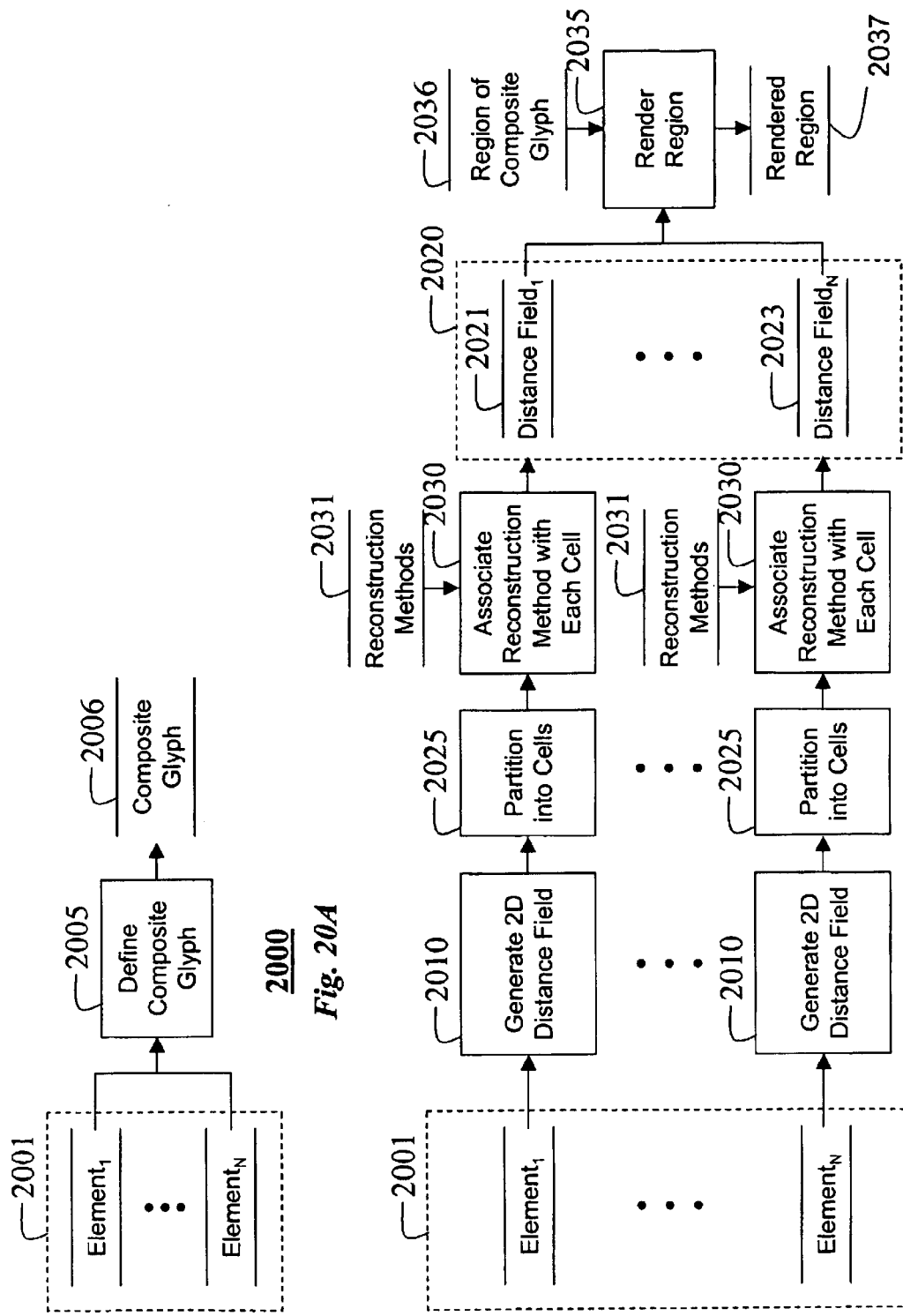

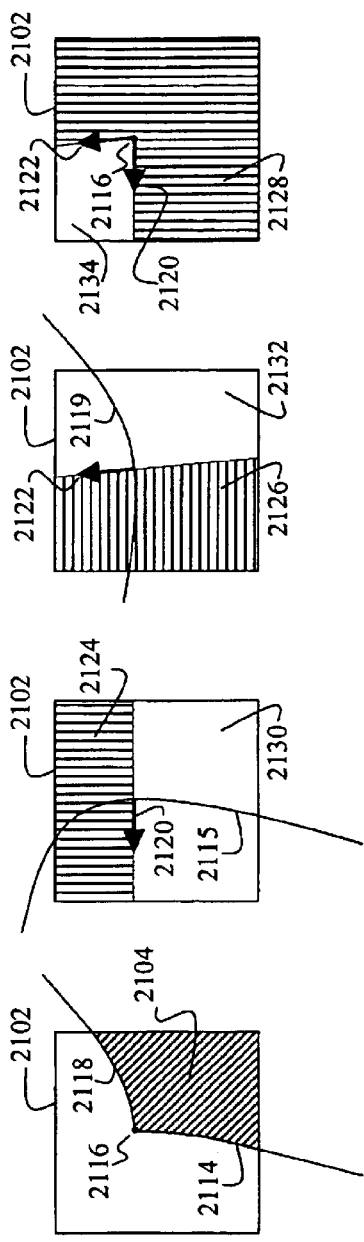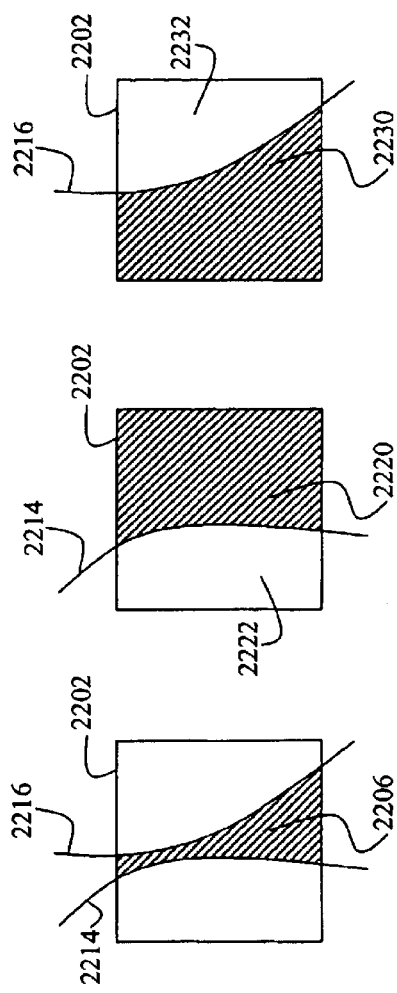

METHOD AND APPARATUS FOR RENDERING CELL-BASED DISTANCE FIELDS USING TEXTURE MAPPING

RELATED APPLICATION

This application is a Continuation in Part of a U.S. patent application titled "Method for Antialiasing an Object Represented as a Two-Dimensional Distance Field in Object-Order," Ser. No. 10/396,861, filed on Mar. 25, 2003 by Frisken, et al.

FIELD OF THE INVENTION

The invention relates generally to the field of computer graphics, and more particularly to rendering objects represented by distance fields.

BACKGROUND OF THE INVENTION

In the field of computer graphics, the rendering of two-dimensional objects is of fundamental importance. Two-dimensional objects, such as character shapes, corporate logos, and elements of an illustration contained in a document, are rendered as static images or as a sequence of frames comprising an animation. There are numerous representations for two-dimensional objects and it is often the case that one representation is better than another representation for specific operations such as rendering and editing. In these cases, a conversion from one form to another is performed.

Although we focus here on digital type, possibly the most common and important two-dimensional object, the following discussion applies to all types of two-dimensional objects.

We begin with some basic background on digital type. A typical Latin font family, such as Times New Roman or Arial, includes a set of fonts, e.g., regular, italic, bold and bold italic. Each font includes a set of individual character shapes called glyphs. Each glyph is distinguished by its various design features, such as underlying geometry, stroke thickness, serifs, joinery, placement and number of contours, ratio of thin-to-thick strokes, and size.

There are a number of ways to represent fonts, including bitmaps, outlines, e.g., Type 1 [Adobe Systems, Inc. 1990] and TrueType [Apple Computer, Inc. 1990], and procedural fonts, e.g., Knuth's Metafont, with outlines being predominant. Outline-based representations have been adopted and popularized by Bitstream Inc. of Cambridge, Mass., Adobe Systems, Inc. of Mountain View, Calif., Apple Computer, Inc., of Cupertino, Calif., Microsoft Corporation of Bellevue, Wash., URW of Hamburg, Germany, and Agfa Compugraphic of Wilmington, Mass.

Hersch, "Visual and Technical Aspects of Type," Cambridge University Press. 1993 and Knuth, "TEX and METAFONT: New Directions in Typesetting," Digital Press, Bedford, Mass. 1979, contain comprehensive reviews of the history and science of fonts.

Of particular importance are two classes of type size: body type size and display type size. Fonts in body type are rendered at relatively small point sizes, e.g., 14 pt. or less, and are used in the body of a document, as in this paragraph. Body type requires high quality rendering for legibility and reading comfort. The size, typeface, and baseline orientation of body type rarely change within a single document.

Fonts in display type are rendered at relatively large point sizes, e.g., 36 pt. or higher, and are used for titles, headlines, and in design and advertising to set a mood or to focus attention. In contrast to body type, the emphasis in display type is on esthetics, where the lack of spatial and temporal aliasing is important, rather than legibility, where contrast may be more important than antialiasing. It is crucial that a framework for representing and rendering type handles both of these classes with conflicting requirements well.

Type can be rendered to an output device, e.g., printer or display, as bi-level, grayscale, or colored. Some rendering engines use bi-level rendering for very small type sizes to achieve better contrast. However, well-hinted grayscale fonts can be just as legible.

Hints are a set of rules or procedures stored with each glyph to specify how an outline of the glyph should be modified during rendering to preserve features such as symmetry, stroke weight, and a uniform appearance across all the glyphs in a typeface.

While there have been attempts to design automated and semi-automated hinting systems, the hinting process remains a major bottleneck in the design of new fonts and in the tuning of existing fonts for low-resolution display devices. In addition, the complexity of interpreting hinting rules precludes the use of hardware for font rendering. The lack of hardware support forces compromises to be made during software rasterization, such as the use of fewer samples per pixel and poor filtering methods, particularly when animating type in real time.

Grayscale font rendering typically involves some form of antialiasing. Antialiasing is a process that smoothes out jagged edges or staircase effects that appear in bi-level fonts. Although many font rendering engines are proprietary, most use supersampling, after grid fitting and hinting, with 4 or 16 samples per pixel followed by down-sampling with a 2×2 or 4×4 box filter, respectively.

Rudimentary filtering, such as box filtering, is justified by the need for rendering speed. However, even that approach is often too slow for real-time rendering, as required for animated type, and the rendered glyphs suffer from spatial and temporal aliasing.

Three important trends in typography reveal some inherent limitations of prior art font representations and associated methods and thus provide the need for change.

The first trend is the increasing emphasis of reading text on-screen due to the dominant role of computers in the office, the rise in popularity of Internet browsing at home, and the proliferation of PDAs and other hand-held electronic devices. These displays typically have a resolution of 72–150 dots per inch, which is significantly lower than the resolution of printing devices.

This low-resolution mandates special treatment when rasterizing type to ensure reading comfort and legibility, as evidenced by the resources that companies such as Microsoft and Bitstream have invested in their respective ClearType and Font Fusion technologies.

The second trend is the use of animated type, or kinetic typography. Animated type is used to convey emotion, to add interest, and to visually attract the reader's attention. The importance of animated type is demonstrated by its wide use in television and Internet advertising.

The third trend is the proliferation of display devices that incorporate numerous layouts for components of pixels of such displays. Vertically and horizontally striped RGB components have been the standard arrangement for conventional displays, as described in U.S. Pat. No. 6,188,385 "Method and apparatus for displaying images such as text", Hill et al. Arranging the components differently, however, has numerous advantages, as described in U.S. Patent Application publication number 20030085906 "Methods and systems for sub-pixel rendering using adaptive filtering", Elliott et al.

Unfortunately, traditional outline-based fonts and corresponding methods have limitations in all of these areas. Rendering type on a low-resolution display requires careful treatment in order to balance the needs of good contrast for legibility, and reduced spatial and/or temporal aliasing for reading comfort.

As stated above, outline-based fonts are typically hinted to provide instructions to the rendering engine for optimal appearance. Font hinting is labor intensive and expensive. For example, developing a well-hinted typeface for Japanese or Chinese fonts, which can have more than ten thousand glyphs, can take years. Because the focus of hinting is on improving the rendering quality of body type, the hints tend to be ineffective for type placed along arbitrary paths and for animated type.

Although high quality filtering can be used to antialias grayscale type in static documents that have a limited number of font sizes and typefaces, the use of filtering in animated type is typically limited by real-time rendering requirements.

Prior art sub-pixel rendering methods, like those described in U.S. Pat. No. 6,188,385, have numerous disadvantages pertaining to all three trends.

First, they require many samples per pixel component to get adequate quality, which is inefficient. When rendering on alternative pixel layouts comprising many components, e.g., such as the layouts described in U.S. Patent Application publication number 20030085906, their methods become impractical. Second, they exploit the vertical or horizontal striping of a display to enable reuse of samples for neighboring pixel components, which fails to work with many alternative pixel component layouts. Third, they use a poor filter when sampling each component because of the inefficiencies of their methods when using a better filter.

Fourth, the methods taught do not provide any measure for mitigating color fringing on alternative pixel component layouts. Fifth, translations of a glyph by non-integer pixel intervals require re-rendering of the glyph. Re-rendering usually requires re-interpreting hints, which is inefficient. Sixth, hints are often specific to a particular pixel component layout, and therefore must be redone to handle the proliferation of alternative pixel component layouts. Redoing hints is both expensive and time consuming.

Rendering Overlapping Objects

When two or more objects are rendered, their rendered images may overlap. For example, the antialiased edges of two glyphs in a line of text may overlap when the glyphs are placed close together. As another example, a single Kanji glyph may be represented by a composition of several elements, such as strokes, radicals, or stroke-based radicals, which may overlap when they are combined to render the single Kanji glyph.

In such cases, a rendering method must handle a region where the objects overlap. There are several methods in the prior art for handling such overlap regions. The "Painter's Algorithm" is a common approach used in computer graphics for two-dimensional and three-dimensional rendering. In the Painter's Algorithm, objects are ordered back-to-front and then rendered in that order. Pixels determined by each rendering simply overwrite corresponding pixels in previous renderings.

Other prior art methods blend color or intensity values of overlapping pixels, i.e., those methods combine the color or intensity values according to a rule, such as choosing a maximum or a minimum value or performing an arithmetic average of the overlapping pixels. Some of those methods use alpha values associated with each pixel to blend the values of the overlapping pixels using a technique called alpha blending.

Those prior art methods can be problematic for a number of reasons.

For example, the Painter's Algorithm results in color artifacts between closely spaced glyphs when rendering on liquid crystal displays (LCDs), organic light emitting diodes (OLEDs), or similar display technologies with separately addressable pixel components.

Prior art methods that blend pixel colors or intensities require additional computation and storage for alpha values and exhibit various artifacts such as edge blurring or edge dropout depending on the blending method used.

In addition, coverage values determined for a set of overlapping objects using prior art coverage-based antialiasing cannot, in general, be blended together to represent the actual coverage of the combined object.

Another prior art approach for handling overlapping objects combines the objects to produce a composite object prior to rendering. For example, for an outline-based glyph composed of multiple elements, the outlines of the elements are joined to form a single outline description prior to rendering. Similarly, for rendering a stroke-based glyph composed of multiple strokes, the strokes are combined into a single set of strokes before rendering.

For object elements represented as distance fields, the distance fields can be combined into a single distance field prior to rendering using CSG operations as described by Perry et al., "Kizamu: A System for Sculpting Digital Characters," *Proceedings ACM SIGGRAPH* 2001, pp. 47–56, 2001. When the composite object is represented as an adaptively sampled distance field, the composite object can require significantly more storage than the total storage required by the elements because the combining may introduce fine detail such as very thin sections or corners into the composite object that are not present in any element.

All of those prior art methods that combine prior to rendering require additional storage space and complex operations to generate the composite object. Furthermore, those methods require two passes, one to build the composite object and one to render the composite object.

Generating and Rendering Component-Based Glyphs

An Asian font, such as a Chinese, Japanese, or Korean font, can include 10,000 or more glyphs. In order to reduce memory requirements, glyphs in such fonts can be represented as compositions of a common set of components, herein referred to as elements, such as strokes or radicals. These common elements are then stored in a memory as a font library and combined either prior to rendering or during rendering to produce a composite glyph.

Prior art methods define the elements using outline descriptors, typically Bezier curves, or stroked skeletons. The elements can be combined prior to rendering into a single shape descriptor, such as a combined outline or a combined set of strokes. Alternatively, each element can be rendered independently, producing, for each pixel, either antialiased intensities or coverage values from the elements that are combined to produce a final antialiased intensity or coverage value for the pixel. Both approaches have problems as described above.

SUMMARY OF THE INVENTION

The invention provides a method and apparatus to render a region of a distance field representing an object. The distance field is partitioned into a set of cells, where each cell includes a set of distance samples and a method for reconstructing the distance field within the cell using the distance samples. A set of source cells is selected from the set of cells of the distance field to enable the rendering of the region. Each source cell is represented as a geometric element in a world coordinate system. Each geometric element is associated with a texture map, where the texture map includes distance samples of the corresponding source cell of the geometric element. Each geometric element is transformed from the world coordinate system to a pixel coordinate system and texture mapped, using the distance samples, to determine a distance for each component of each pixel associated with the geometric element. The distance of each component of each pixel is mapped to an antialiased intensity of the component of the pixel.

BRIEF DESCRIPTION OF THE DRAWINGS

FIG. 4 is a flow diagram of a method for antialiasing an object in image-order according to the invention;

FIG. 5 is a graph of a linear filter used by the invention;

FIG. 15 is a flow diagram of a method for antialiasing a set of objects in object-order according to the invention;

FIG. 18 is a flow diagram of a method for typesetting a set of glyphs according to the invention;

FIGS. 21A–21D is a diagram of a corner cell according to the invention;

FIGS. 22A–22C is a diagram of a two-segment cell according to the invention;

DETAILED DESCRIPTION OF THE PREFERRED EMBODIMENT

Distance Field Representation of Glyphs

Figure 2B:
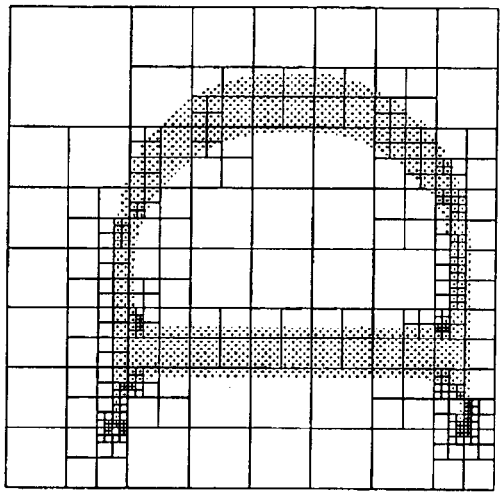
FIGS. 2A and 2B are block diagrams of distance field representations according to a preferred embodiment of the invention.

Our invention represents a closed two-dimensional shape S, such as a glyph, a corporate logo, or any digitized representation of an object, as a two-dimensional signed distance field D. For the purpose of our description, we use glyphs.

Informally, the distance field of a glyph measures a distance, e.g., a minimum distance, from any point in the field to the edge of the glyph, where the sign of the distance is negative if the point is outside the glyph and positive if the point is inside the glyph. Points on the edge have a zero distance.

Formally, the distance field is a mapping $D:\Re^2 \to \Re$ for all $p \in \Re^2$ such that $D(p) = \text{sign}(p) \cdot \min\{\|p-q\|:$ for all points q on the zero-valued iso-surface, i.e., edge, of S$\}$, $\text{sign}(p) = \{-1$ if p is outside S, $+1$ if p is inside S$\}$, and $\|\cdot\|$ is the Euclidean norm.

Prior art coverage-based rendering methods that use a single discrete sample for each pixel or for each pixel component can completely miss the glyph even when the sample is arbitrarily close to the outline. The rendered glyph has jagged edges and dropout, which are both forms of spatial aliasing. If the glyph is animated, then temporal aliasing causes flickering outlines and jagged edges that seem to 'crawl' during motion. Taking additional samples per pixel or per pixel component to produce an antialiased rendition can reduce these aliasing effects, but many samples may be required for acceptable results.

In contrast, continuously sampled distance values according to our invention indicate a proximity of the glyph, even when the samples are outside the shape, thereby eliminating the dropout artifacts of the prior art. The continuous nature of the sampled distance values can be used, according to our invention, to mitigate spatial aliasing artifacts.

Furthermore, because the distance field varies smoothly, i.e., it is $C^0$ continuous, sampled values change slowly as the glyph moves, reducing temporal aliasing artifacts.

Distance fields have other advantages. Because they are an implicit representation, they share the benefits of implicit functions. In particular, distance fields enable an intuitive interface for designing fonts. For example, individual components of glyphs such as stems, bars, rounds, and serifs can be designed separately. After design, the components can be blended together using implicit blending methods to compose different glyphs of the same typeface.

Distance fields also have much to offer in the area of kinetic typography or animated type because distance fields provide information important for simulating interactions between objects.

In a preferred embodiment, we use adaptively sample distance fields, i.e., ADFs, see U.S. Pat. No. 6,396,492, "Detail-directed hierarchical distance fields, " Frisken, Perry, and Jones, incorporated herein by reference.

ADFs are efficient digital representations of distance fields. ADFs use detail-directed sampling to reduce the number of samples required to represent the field. The samples are stored in a spatial hierarchy of cells, e.g., a quadtree, for efficient processing. In addition, ADFs provide a method for reconstructing the distance field from the sampled values.

Detail-directed or adaptive sampling samples the distance field according to a local variance in the field: more samples are used when the local variance is high, and fewer samples are used when the local variance is low. Adaptive sampling significantly reduces memory requirements over both regularly sampled distance fields, which sample at a uniform rate throughout the field, and 3-color quadtrees, which always sample at a maximum rate near edges.

Figure 2A:
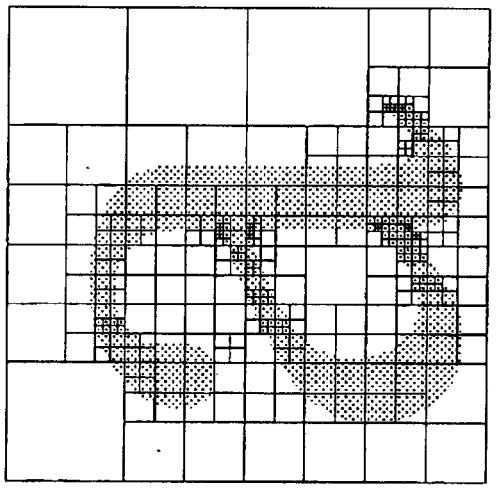
Figure 1B:
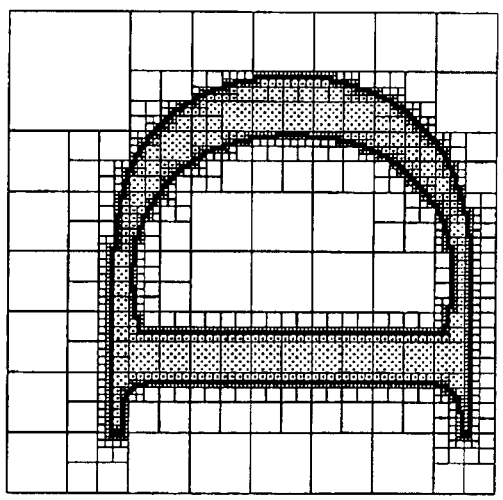
FIGS. 1A and 1B are block diagrams of prior art distance field representations for glyphs.
Figure 1A:
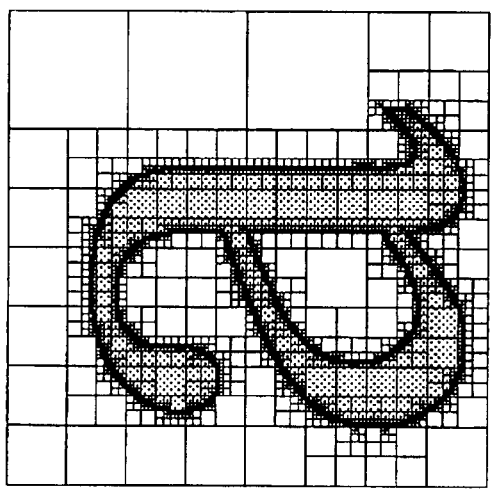

FIGS. 1A–1B compare the number of cells required for a 3-color quadtree for a Times Roman 'a' and 'D' with the number of cells required for a bi-quadratic ADF in FIGS. 2A–2B of the same accuracy. The number of cells is directly related to storage requirements. Both quadtrees have a resolution equivalent to a 512×512 image of distance values. The 3-color quadtrees for the 'a' and the 'D' have 17,393 and 20,813 cells respectively, while their corresponding bi-quadratic ADFs have 457 and 399 cells. Bi-quadratic ADFs typically require 5–20 times fewer cells than the prior art bi-linear representation of Frisken et al., "Adaptively Sampled Distance Fields: a General Representation of Shape for Computer Graphics," *Proceedings ACM SIGGRAPH* 2000, pp. 249–254, 2000.

Bi-Quadratic Reconstruction Method

Frisken et al. use a quadtree for the ADF spatial hierarchy, and reconstruct distances and gradients inside each cell from the distances sampled at the four corners of each cell via bi-linear interpolation. They suggest that "higher order reconstruction methods . . . might be employed to further increase compression, but the numbers already suggest a point of diminishing return for the extra effort".

However, bi-linear ADFs are inadequate for representing, rendering, editing, and animating character glyphs according to the invention. In particular, they require too much memory, are too inefficient to process, and the quality of the reconstructed field in non-edge cells is insufficient for operations such as dynamic simulation.

A "bounded-surface" method can force further subdivision in non-edge cells by requiring that non-edge cells within a bounded distance from the surface, i.e., an edge, pass an error predicated test, see Perry et al., "Kizamu: A System for Sculpting Digital Characters," *Proceedings ACM SIGGRAPH* 2001, pp. 47–56, 2001. Although the bounded-surface method reduces the error in the distance field within this bounded region, we have found that for bi-linear ADFs that method results in an unacceptable increase in the number of cells.

To address those limitations, we replace the bi-linear reconstruction method with a bi-quadratic reconstruction method. Bi-quadratic ADFs of typical glyphs tend to require 5–20 times fewer cells than bi-linear ADFs. Higher reduction in the required number of cells occurs when we require an accurate distance field in non-edge cells for operations such as dynamic simulation and animated type.

This significant memory reduction allows the glyphs required for a typical animation to fit in an on-chip cache of modem CPUs. This has a dramatic effect on processing times because system memory access is essentially eliminated, easily compensating for the additional computation required by the higher order reconstruction method.

Figure 3:
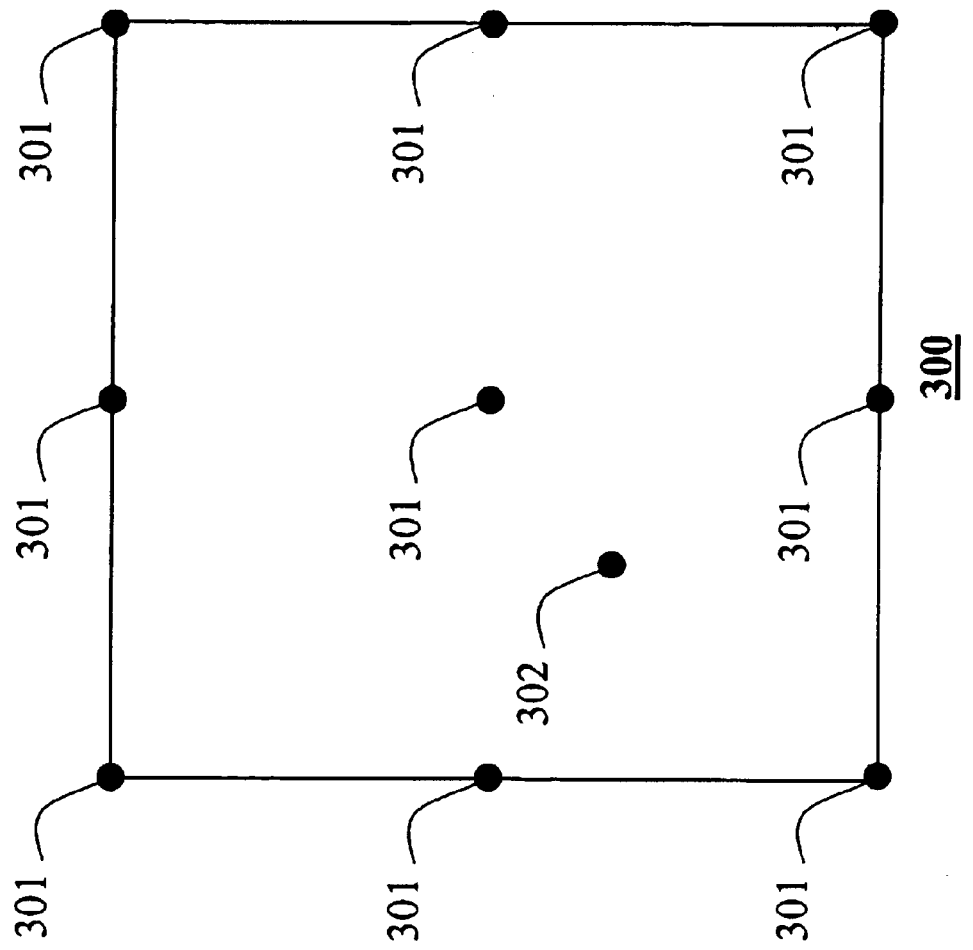
FIG. 3 is a block diagram of a bi-quadratic cell of the distance field according to a preferred embodiment of the invention.

FIG. 3 illustrates a bi-quadratic ADF cell 300 according to our preferred embodiment. Each cell in the bi-quadratic ADF contains nine distance values 301. A distance and a gradient at a point (x, y) 302 are reconstructed from these nine distance values according to Equations 1–3 below.

There are a variety of bi-quadratic reconstruction methods available. We use a bivariate interpolating polynomial which guarantees $C^0$ continuity along shared edges of neighboring cells of identical size. As with the bi-linear method, continuity of the distance field between neighboring cells of different size is maintained to a specified tolerance using an error predicate. The error predicate controls cell subdivision during ADF generation, see Perry et al., above.

The distance and gradient at the point (x, y) 302, where x and y are expressed in cell coordinates, i.e., (x, y)∈[0,1]×[0,1], are determined as follows:

Let $xv_1 = x - 0.5$ and $xv_2 = x - 1$

Let $yv_1 = y - 0.5$ and $yv_2 = y - 1$

Let $bx_1 = 2xv_1 \cdot xv_2$, $bx_2 = -4x \cdot xv_2$, and $bx_3 = 2x \cdot xv_1$ Let $by_1 = 2yv_1 \cdot yv_2$, $by_2 = -4y \cdot yv_2$, and $by_3 = 2y \cdot yv_1$ $$dist = by_1 \cdot (bx_1 \cdot d_1 + bx_2 \cdot d_2 + bx_3 \cdot d_3) + \quad (1)$$
$$by_2 \cdot (bx_1 \cdot d_4 + bx_2 \cdot d_5 + bx_3 \cdot d_6) +$$
$$by_3 \cdot (bx_1 \cdot d_7 + bx_2 \cdot d_8 + bx_3 \cdot d_9)$$

$$grad_x = -[by_1 \cdot (4x \cdot (d_1 - 2d_2 + d_3) - 3d_1 - d_3 + 4d_2) + \quad (2)$$
$$by_2 \cdot (4x \cdot (d_4 - 2d_5 + d_6) - 3d_4 - d_6 + 4d_5) +$$
$$by_3 \cdot (4x \cdot (d_7 - 2d_8 + d_9) - 3d_7 - d_9 + 4d_8)]$$

$$grad_y = -[(4y - 3) \cdot (bx_1 \cdot d_1 + bx_2 \cdot d_2 + bx_3 \cdot d_3) - \quad (3)$$
$$(8y - 4) \cdot (bx_1 \cdot d_4 + bx_2 \cdot d_5 + bx_3 \cdot d_6) +$$
$$(4y - 1) \cdot (bx_1 \cdot d_7 + bx_2 \cdot d_8 + bx_3 \cdot d_9)].$$

Reconstructing a distance using floating point arithmetic can require ~35 floating-point operations (flops), and reconstructing a gradient using floating point arithmetic can require ~70 flops. Because our reconstruction methods do not contain branches and the glyphs can reside entirely in an on-chip cache, we can further optimize these reconstruction methods by taking advantage of special CPU instructions and the deep instruction pipelines of modern CPUs. Further, we can reconstruct a distance and a gradient using fixed-point arithmetic.

Compression for Transmission and Storage

Linear Quadtrees

The spatial hierarchy of the ADF quadtree is required for some processing, e.g., collision detection, but is unnecessary for others, e.g., cell-based rendering as described below.

To provide compression for transmission and storage of ADF glyphs, we use a linear quadtree structure, which stores our bi-quadratic ADF as a list of leaf cells. The tree structure can be regenerated from the leaf cells as needed.

Each leaf cell in the linear ADF quadtree includes the cell's x and y positions in two bytes each, the cell level in one byte, the distance value at the cell center in two bytes, and the eight distance offsets from the center distance value in one byte each, for a total of 15 bytes per cell.

Each distance offset is determined by subtracting its corresponding sample distance value from the center distance value, scaling by the cell size to reduce quantization error, and truncating to eight bits. The two bytes per cell position and the one byte for cell level can represent ADFs up to $2^{16} \times 2^{16}$ in resolution. This is more than adequate for representing glyphs to be rendered at display screen resolutions.

Glyphs can be accurately represented by 16-bit distance values. Encoding eight of the distance values as 8-bit distance offsets provides substantial savings over storing each of these values in two bytes. Although, in theory, this may lead to some error in the distance field of large cells, we have not observed any visual degradation.

A high-resolution glyph typically requires 500–1000 leaf cells. Lossless entropy encoding can attain a further 35–50% compression. Consequently, an entire typeface of high-resolution ADFs can be represented in 300–500 Kbytes. If only body type is required or the target resolution is very coarse, as for cell phones, then lower resolution ADFs can be used that require ¼ to ½ as many cells.

These sizes are significantly smaller than grayscale bitmap fonts, which require ~0.5 Mbytes per typeface for each point size, and are comparable in size to well-hinted outline-based fonts. Sizes for TrueType fonts range from 10's of Kbytes to 10's of Mbytes depending on the number of glyphs and the amount and method of hinting. Arial and Times New Roman, two well-hinted fonts from the Monotype Corporation, require 266 Kbytes and 316 Kbytes respectively.

Run-time Generation from Outlines

According to our invention, and as described in detail below, ADFs can be generated quickly from existing outline or boundary et al. The minimum distance to a glyph's outline or boundary is computed efficiently using Bezier clipping, see Sederberg et al., "Geometric Hermite Approximation of Surface Patch Intersection Curves," *CAGD*, 8(2), pp. 97–114, 1991.

Generation requires 0.04–0.08 seconds per glyph on a 2 GHz Pentium IV processor. An entire typeface can be generated in about four seconds. Because conventional hints are not needed, the boundary descriptors required to generate the ADFs are substantially smaller than their corresponding hinted counterparts.

Therefore, rather than storing ADFs, we can store these minimal outlines and generate ADF glyphs dynamically from these outlines on demand. The reduced size of these minimal outlines is important for devices with limited memory and for applications that transmit glyphs across a bandwidth-limited network.

Figure 10:
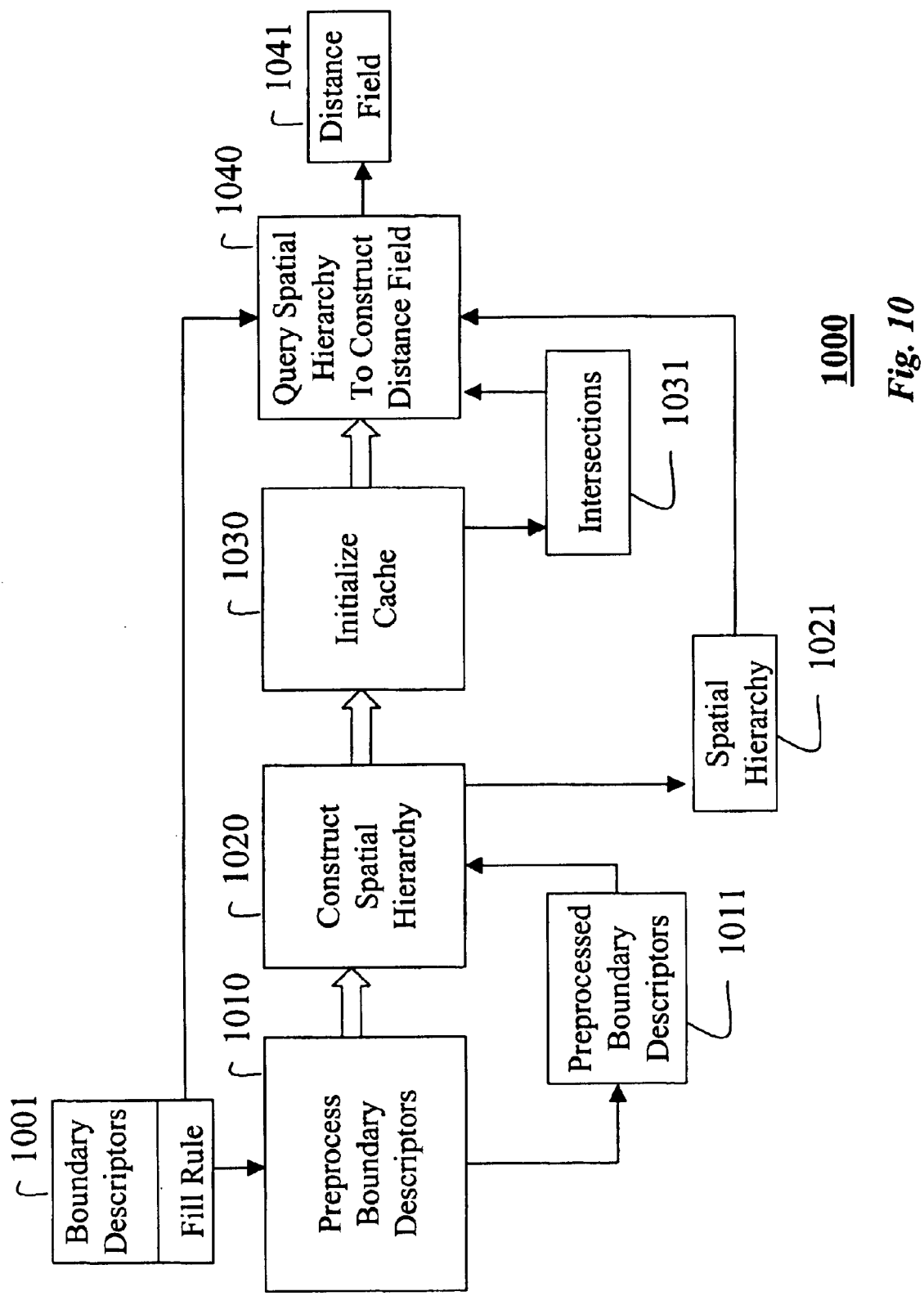
FIG. 10 is a flow diagram of a method for converting a two-dimensional object to a distance field according to the invention.

FIG. 10 shows a method 1000 for converting a two-dimensional object, such as a glyph, to a two-dimensional distance field. The object 1001 is represented as a set of boundary descriptors, e.g., splines, and a fill rule, e.g., an even-odd rule or a non-zero winding rule.

The set of boundary descriptors are first preprocessed 1010. The preprocessing subdivides the boundary descriptors to reduce their spatial extent. The boundary descriptors can also be coalesced to reduce the cardinality of the set of boundary descriptors. The preprocessing allows us to reduce the number of boundary descriptors that need to be queried for each location when determining the unsigned distance, as described below.

A spatial hierarchy 1021, e.g., a quadtree, is constructed 1020 from the preprocessed set of boundary descriptors 1011. A cache of intersections 1031 is initialized 1030. The cache of intersections 1031 stores locations where the boundary descriptors intersect a set of lines, e.g., horizontal, vertical, diagonal, etc., of the distance field, and the direction of the intersection. This eliminates redundant computations when determining the sign of the unsigned distances. The intersections can be sorted by intervals.

The spatial hierarchy 1021 is then queried 1040 at a set of locations to determine a set of distances at those locations. The set of distances is used to construct a two-dimensional distance field 1041. The querying invokes a distance function, e.g., Bezier clipping, at each location to determine an unsigned distance. The cache of intersections, the location, and the fill rule are used to determine a sign for the distance.

Compression via Component-Based Fonts

Significant compression for Chinese, Japanese, and Korean fonts, which can consist of 10,000 or more glyphs, can be achieved by using a component-based representation as in Font Fusion. That representation decomposes glyphs into common strokes and radicals, i.e., complex shapes common to multiple glyphs, stores the strokes and radicals in a font library, and then recombines them in the font rendering engine.

Because distance fields are an implicit representation, ADFs can be easily combined using blending or CSG operations, and thus are well suited for compression via that component-based approach.

Representing Corners in a Two Dimensional Distance Field

Detail-directed sampling with a bilinear or bi-quadratic reconstruction method allows ADFs to represent relatively smooth sections of a boundary of a two-dimensional object with a small number of distance values. However, near corners, the distance field has a high variance that is not well approximated by these reconstruction methods. In order to represent the distance field near corners accurately, such ADFs require cells containing corners to be highly subdivided, significantly increasing memory requirements. In addition, a maximum subdivision level of the ADF, accuracy with which corners can be represented using bilinear and bi-quadratic ADF cells.

Figure 13:
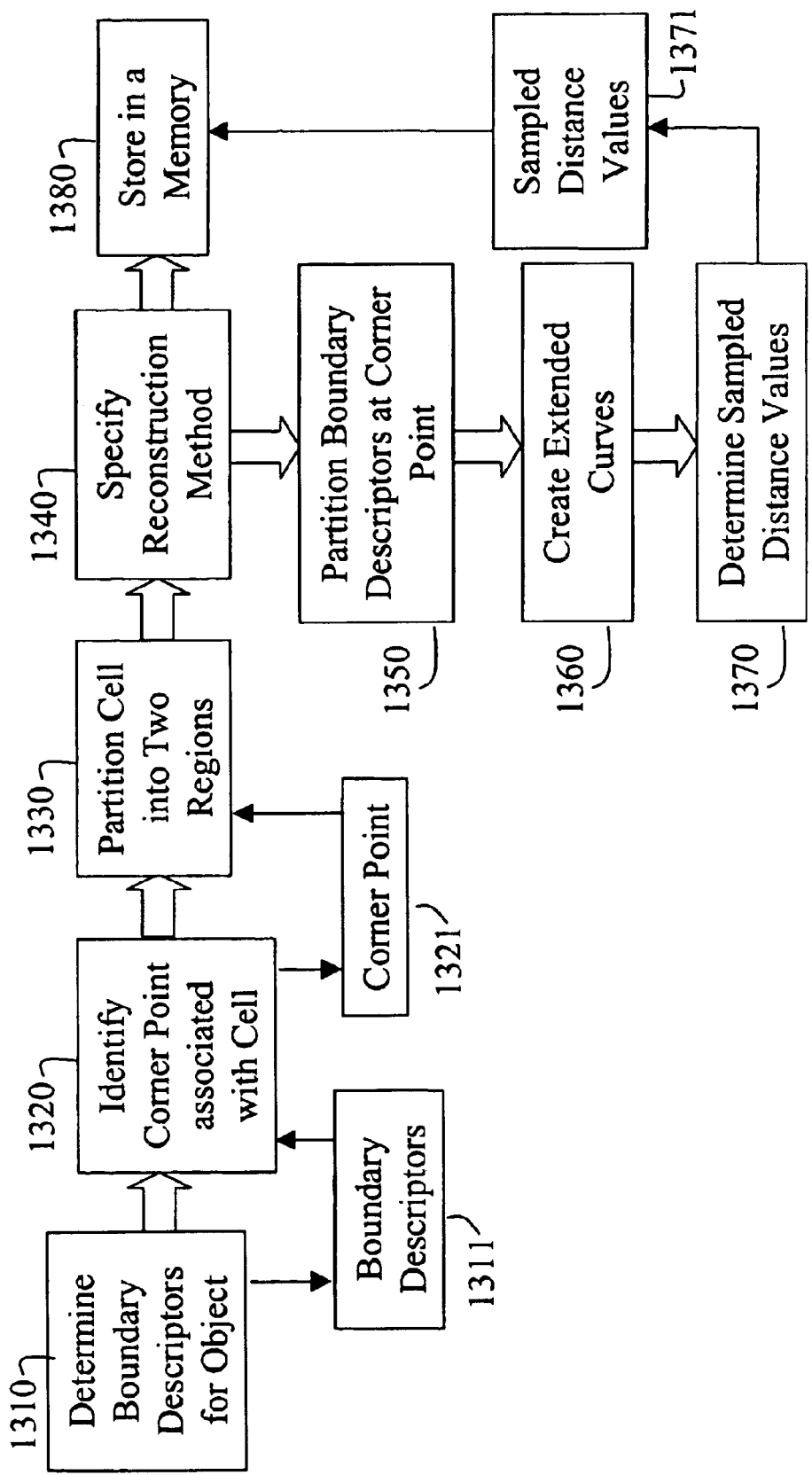
FIG. 13 is a flow diagram of a method for generating a two-dimensional distance field within a cell enclosing a corner of a two-dimensional object according to the invention.

Referring to FIG. 13, to address this problem, our invention provides a method 1300 for generating a two-dimensional distance field within a cell associated with a corner of a two-dimensional object, such as a glyph.

The method 1300 determines 1310 an ordered set of boundary descriptors 1311 from the two-dimensional object and identifies 1320 a corner point 1321 associated with, e.g., near or within, a cell from the ordered set of boundary descriptors 1311. The cell is then partitioned 1330 into two regions, a first region nearest the corner and a second region nearest the boundary of the object. The method 1300 also specifies 1340 a reconstruction method and a set of sampled distance values 1371 for reconstructing distances within the cell and stores 1380 the corner point 1321, lines delimiting the regions, the reconstruction method, and the set of sampled distance values 1371 in a memory.

The reconstruction method determines a distance at a point within the cell according to which region the point lies in. A distance for a query point in the first region is determined as the distance from the query point to the corner point.

For determining distances in the second region, we partition 1350 the ordered set of boundary descriptors 1311 into two subsets, one comprising boundary descriptors before the corner point 1321 and one comprising boundary descriptors after the corner point 1321. Each subset of boundary descriptors is then extended 1360 to form an extended curve that partitions the cell into an interior and exterior section. For each section, the distance field within the cell can be reconstructed from the set of sample distance values 1371 that are determined 1370 from the corresponding extended curve. A bi-quadratic reconstruction method would require that nine distance values be stored for each of the two extended curves.

Note that the intersection of the two interior sections forms the corner of the object. Hence, distances within the second region can be determined by reconstructing a distance to the first interior section and a distance to the second interior section and then selecting the minimum of the two determined distances.

The two regions can be specified from two directed lines passing through the corner point, each line perpendicular to one of the two subsets of boundary descriptors. Each line can be specified by the corner point and the outward facing normal of the corresponding subset of boundary descriptors at the corner point. When a line is thus defined, we can determine which side of the line a query point lies on by determining a cross product of a vector from the query point to the corner point and the outward facing normal. Points lying on the exterior side of both lines lie in the first region while points lying on the interior side of either line lie in the second region.

FIGS. 21A–21D illustrate a representation of a corner cell. In FIG. 21A, a cell 2102 contains a portion of an object 2104, where an inside of the object 2104 is shaded and an outside is left white. A boundary of the object 2104 within the cell 2102 includes a first set of boundary descriptors 2114, a corner point 2116, and a second set of boundary descriptors 2118.

A distance field in the cell 2102 of the portion of the object 2104 can be represented by combining a distance field of an extended curve 2115, illustrated in FIG. 21B, a distance field of an extended curve 2119, illustrated in FIG. 21C, and a distance field of the corner point 2116, illustrated in FIG. 21D. The extended curve 2115 is defined by extending the first set of boundary descriptors 2114. Similarly, the extended curve 2119 is defined by extending the second set of boundary descriptors 2118.

In a preferred embodiment, the distance fields of the extended curves 2115 and 2119 are each represented using a set of sampled distances and a reconstruction method such as a bilinear or bi-quadratic reconstruction method, while the distance field of the corner point 2116 is represented by a procedure for determining a signed distance from a sample point to the corner point 2116.

A sign of the distance field of the corner point 2116 can be determined from an angle of the corner represented by the corner point 2116. If the angle of the corner measured on the outside of the portion of the object 2104 is acute, then the sign of the distance field of the corner point 2116 is positive. If the angle of the corner measured on the outside of the portion of the object 2104 is obtuse, then the sign of the distance field of the corner point 2116 is negative. For example, the corner represented by the corner point 2116 is obtuse and the sign of the distance field of the corner is negative.

The distance fields of the extended curves 2115 and 2119 and the corner point 2116 each have a valid area and an invalid area. The valid areas and the invalid areas are separated by a first line defined by a normal vector 2120 to the extended curve 2115 and a second line defined by a normal vector 2122 to the extended curve 2119, both lines passing through the corner point 2116.

FIGS. 21B, 21C, and 21D show shaded invalid areas 2124, 2126, and 2128 and unshaded valid areas 2130, 2132, and 2134 for the extended curves 2115 and 2119 and the corner point 2116, respectively. The first and second regions, defined above for the method 1300, can be determined from the valid areas. The first region, i.e., the region of the cell nearest the corner point 2116, is the same as the valid area 2134 of the corner point 2116. The second region, i.e., the region of the cell nearest the boundary of the object 2104, is a union of the valid area 2130 of the extended curve 2115 and the valid area 2132 of the extended curve 2119.

In one embodiment of the invention, to determine a distance at a sample point in the cell 2102, we reconstruct a first signed distance and a first corresponding validity flag from the distance field of the extended curve 2115, a second signed distance and a second corresponding validity flag from the distance field of the extended curve 2119, and a third signed distance and a third corresponding validity flag from the distance field of the corner point 2116. The first, second, and third validity flags are determined according to whether the sample point lies inside or outside the valid areas of the extended curve 2115, the extended curve 2119, and the corner point 2116, respectively. The distance from the sample point to the portion of the object 2104 is a minimum of the valid first, second, and third signed distances for the sample point.

Representing Stems and other Thin Structures in a Two Dimensional Distance Field Using corner cells enables the ADF to represent corners accurately without excessive subdivision of cells. However, in addition to corners, two-dimensional objects such as glyphs can have thin structures such as vertical stems or horizontal bars. Near such structures, the distance field can be $C^1$ discontinuous. The distance field is $C^1$ discontinuous at a point when a gradient at the point is singular, i.e., not continuous.

For example, the distance field is $C^1$ discontinuous along a curve midway between boundary descriptors on either side of a thin structure. Because this discontinuity can require excessive subdivision of the cells of the ADF, there is a need for a better cell representation and reconstruction method near thin structures.

Our present invention provides a 'two-segment cell' representation and a two-segment cell reconstruction method for cells near thin structures. FIGS. 22A, 22B, and 22C illustrate a two-segment cell according to our present invention.

In FIG. 22A, a cell 2202 contains a portion of an object 2206, where the inside of the object 2206 is shaded and the outside is left white. The boundary of the portion of the object 2206 in the cell 2202 includes a first set of boundary descriptors including a first segment 2214 and a second set of boundary descriptors including a second segment 2216.

A distance field of the portion of the object 2206 within the cell 2202 can be represented by combining a distance field of the first segment 2214, illustrated in FIG. 22B, and a distance field of the second segment 2216, illustrated in FIG. 22C. In a preferred embodiment, the distance fields of the first segment 2214 and the second segment 2216 are each represented using a set of sampled distances and a reconstruction method, such as a bi-linear or a bi-quadratic reconstruction method.

To determine a distance from a sample point to the portion of the object 2206 in the cell 2202, we reconstruct, at the sample point, a first signed distance from the distance field of the first segment 2214 and a second signed distance from the distance field of the second segment 2216.

In FIG. 22B, a positive area 2220 of the signed distance field for the first segment 2214 is shaded, and a negative area 2222 is left white. In FIG. 22C, a positive area 2230 of the signed distance field for the second segment 2216 is shaded, and a negative area 2232 is left white. The portion of the object 2206 in the cell 2202 is an intersection of the shaded positive area 2220 of FIG. 22B and the shaded positive area 2230 of FIG. 22C. In the preferred embodiment, a distance from the sample point to the portion of the object 2206 in the cell 2202 is a minimum of the first signed distance and the second signed distance.

Figure 23:
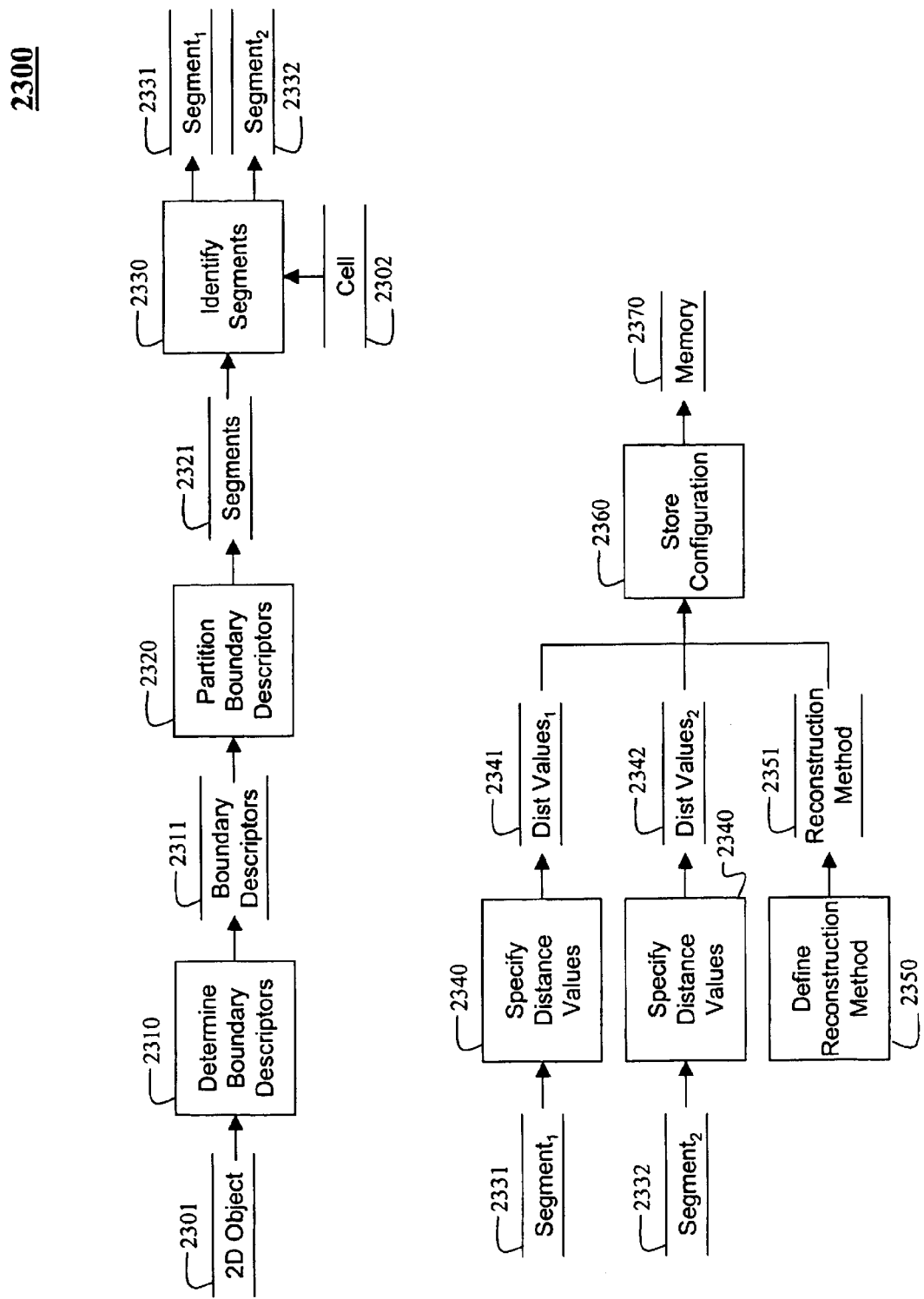
FIG. 23 is a flow diagram of a method for generating a two-dimensional distance field within a cell associated with a two-dimensional object according to the invention.

FIG. 23 illustrates a method 2300 for generating a two-dimensional distance field within a two-segment cell 2302 associated with a two-dimensional object 2301. A set of boundary descriptors 2311 is determined 2310 for the object 2301. The boundary descriptors 2311 can have various representations, including line segments and spline curves, e.g., Bezier curves.

The boundary descriptors 2311 are partitioned 2320 into a set of segments 2321, where segments in the set of segments 2321 are delimited by a set of features that can be determined in a preprocessing step or during the partitioning 2320. Examples of features include corners of the object 2301, points where the boundary descriptors 2311 have a substantial degree of curvature, an endpoint of a particular boundary descriptor, or a point on a particular boundary descriptor where an accumulated curvature along a particular segment exceeds a predetermined threshold. Placing a feature at a point of substantial accumulated curvature enables, for example, delimiting a segment if the segment begins to curve back on itself, e.g., if a magnitude of the accumulated curvature of the segment exceeds ninety degrees.

We identify 2330 a first segment 2331 and a second segment 2332 in the set of segments 2321 for the cell 2302. In a preferred embodiment, the identifying 2330 locates a nearest segment from the set of segments 2321 for each test point in a set of test points within the cell 2302 by determining a distance from each test point to each segment in the set of segments 2321. If every test point in the cell 2302 is nearest to one of two particular segments in the set of segments 2321, then we identify 2330 the two particular segments as the first segment 2331 and the second segment 2332 for the two-segment cell.

We specify 2340 a first set of distance values 2341 to represent a distance field of the first segment 2331, and a second set of distance values 2342 to represent a distance field of the second segment 2332. For example, a set of nine distance values can be specified 2340 together with a bi-quadratic reconstruction method to represent a distance field corresponding to one of the segments.

The method 2300 defines 2350 a reconstruction method 2351 for combining the first set of distance values 2341 and the second set of distance values 2342 to reconstruct the distance field within the cell 2302. In a preferred embodiment, the reconstruction method 2351 reconstructs the distance field at a sample point in the cell 2302 by determining a first distance from the sample point to the first segment 2331 using the first set of distance values 2341, determining a second distance from the sample point to the second segment 2332 using the second set of distance values 2342, and combining the first distance and the second distance by taking a minimum of the first distance and the second distance.

The set of distance values 2341, the set of distance values 2342, and the reconstruction method 2351 are stored 2360 in a memory 2370 to enable reconstruction of the two-dimensional distance field of the two-dimensional object 2301 within the cell 2302.

Determining an Optimal Configuration of Cells for Distance Fields with Specialized Cells Using specialized cells such as corner cells and two-segment cells can mitigate excessive subdivision of cells of an ADF representing an object, such as a glyph, with corners and thin structures. However, determining an optimal configuration of cells for a distance field that uses such specialized cells can be significantly more complicated than determining an optimal configuration of cells without specialized cells. A configuration of cells for a distance field includes, for example, locations, sizes, orientations, reconstruction methods, types, and geometries for the cells.

There are many possible cell configurations for partitioning a region containing a distance field representing an object. The prior art of Frisken et al. teaches a top-down and a bottom-up subdivision method that partitions the region into rectangular cells to generate a quadtree-based or octree-based ADF, thereby providing a non-optimal configuration without specialized cells. Unlike the prior art, the present invention provides a method for generating a cell-based distance field representation with an optimal configuration of cells. In the preferred embodiment, the optimal configuration can include specialized cells such as corner cells and two-segment cells.

Figure 24B:
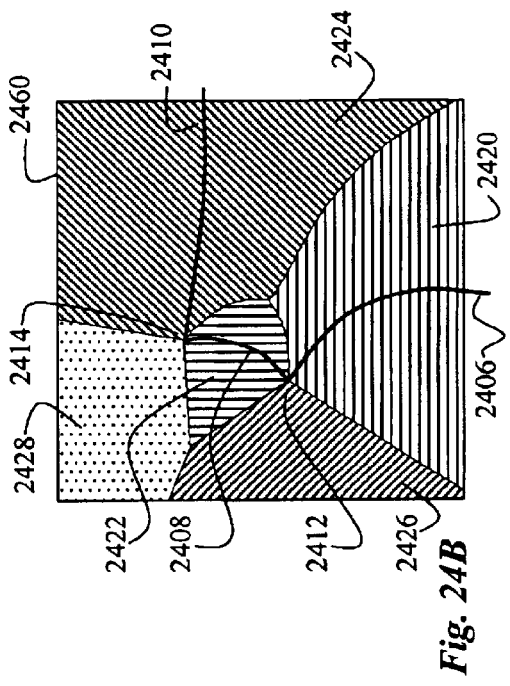
FIGS. 24B–24D is a diagram of three configurations of cells partitioning a region according to the invention.
Figure 24D:
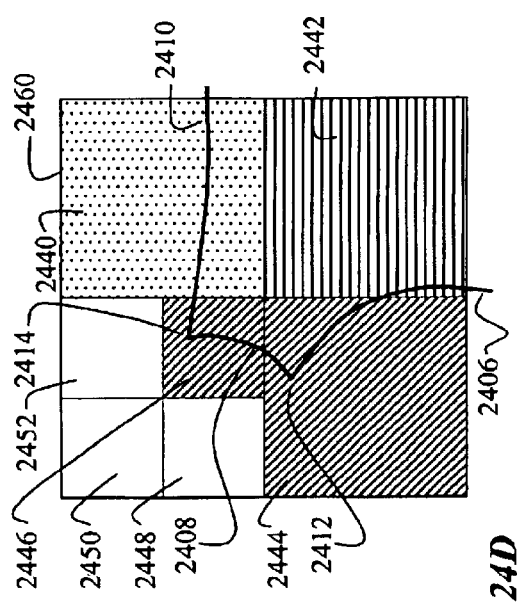
Figure 24A:
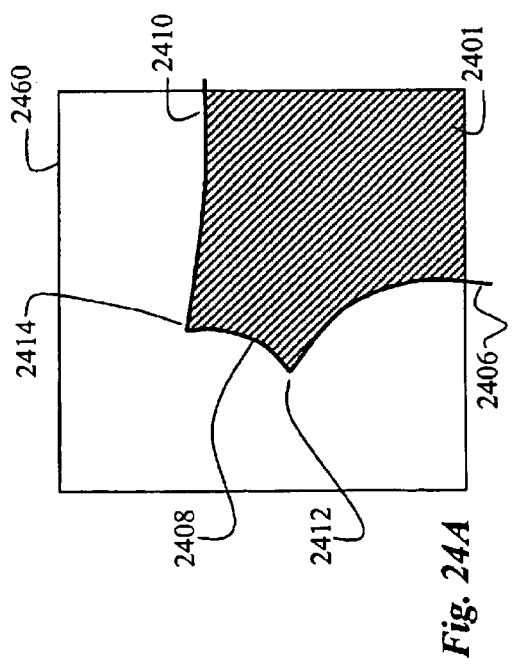
FIG. 24A is a diagram of a portion of an object within a region.

FIG. 24A illustrates a region 2460 containing a portion of a two-dimensional object 2401, where an inside of the object is shaded and an outside is left white. A boundary of the portion of the object 2401 within the region 2460 includes a first segment 2406 associated with a first set of boundary descriptors, a second segment 2408 associated with a second set of boundary descriptors, and a third segment 2410 associated with a third set of boundary descriptors. The first segment 2406 and the second segment 2408 meet at a corner 2412 of the portion of the object 2401, while the second segment 2408 and the third segment 2410 meet at a corner 2414 of the portion of the object 2401.

Figure 24C:
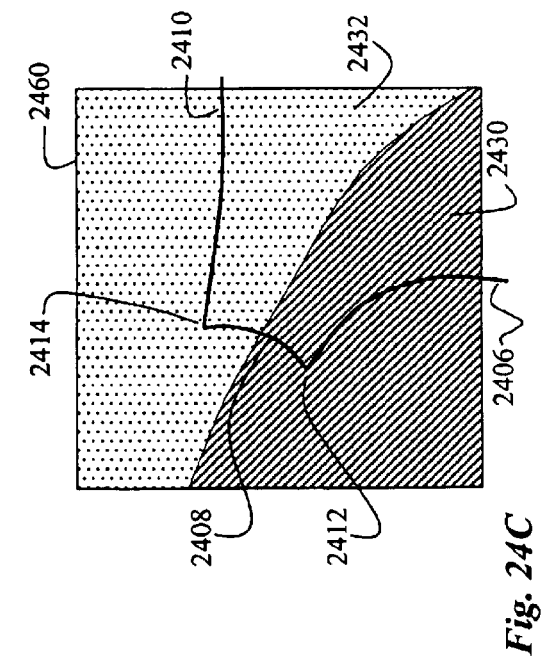

There are many ways to partition the region 2460 to determine a configuration of cells. FIGS. 24B–24D show various configurations of cells that partition the region 2460 when the configurations can include two-segment cells and corner cells. A particular definition of 'optimal' for an optimal configuration depends on many factors, some of which are illustrated in FIGS. 24B–24D, and others of which are discussed below.

FIG. 24B shows a Voronoi diagram for the boundary of the object 2401 within the region 2460. Each differently shaded cell shows a portion of the region 2460 nearest to a particular segment or corner. Points in a cell 2420 are nearest to the segment 2406. Points in a cell 2422 are nearest to the segment 2408. Points in a cell 2424 are nearest to the segment 2410. Points in a cell 2426 are nearest to the corner 2412. Finally, points in a cell 2428 are nearest to the corner 2414.

The Voronoi diagram of FIG. 24B is an example of an optimal configuration of cells for the region 2460 when the configuration uses only 'one-segment cells', a one-segment cell defined to be a cell for which the distance field within the cell can be determined from a single segment. Distances in a one-segment cell can be reconstructed from a set of sampled distance values using, for example, a bi-quadratic reconstruction method when the segment nearest to the cell has a substantially low curvature. Various alternative reconstruction methods are also possible, including an analytic determination of the distance from points in the cell to the segment nearest to the cell.

The Voronoi diagram of FIG. 24B is an optimal configuration of cells in the sense that it provides a minimal number of cells from which the distance field of the portion of the object 2401 can be reconstructed accurately everywhere in the region 2460 using one-segment cells. A disadvantage of using the Voronoi diagram to partition the region 2460 is that determining an exact configuration of the Voronoi diagram is difficult. A second disadvantage of using the Voronoi diagram is that cells can have very complex boundaries, thereby resulting in substantially long computation times for rasterizing and locating cells during rendering.

FIG. 24C provides an alternative optimal configuration of cells partitioning the region 2460 which uses corner cells, as defined above. The region 2460 is partitioned into a first corner cell 2430 and a second corner cell 2432. Distances within the corner cell 2430 can be reconstructed using the first segment 2406, the corner 2412, and the second segment 2408. Distances within the corner cell 2432 can be reconstructed using the second segment 2408, the corner 2414, and the third segment 2410. Distances within the corner cell 2430 or the corner cell 2432 can be reconstructed to substantially high accuracy from sampled distance values using a corner cell reconstruction method such as the one described above.

An advantage of the configuration of cells illustrated in FIG. 24C over the configurations of FIGS. 24B and 24D is that the configuration in FIG. 24C requires fewer cells. A disadvantage is that corner cell reconstruction methods are usually more complex and inefficient than one-segment and two-segment reconstruction methods and the configuration of cells of FIG. 24C requires that a corner cell reconstruction method be used for all points in the region 2460. A second disadvantage with the configuration of FIG. 24C is that, like the Voronoi diagram of FIG. 24B, cell boundaries may be difficult to determine. A third disadvantage is that cell boundaries may be very complex, thereby resulting in substantially long computation times for rasterizing and locating cells during rendering.

FIG. 24D illustrates a third alternative optimal partitioning of the region 2460. The region 2460 is partitioned into a quadtree, where each leaf cell in the quadtree is shaded according to its cell type. A cell 2440 is a one-segment cell, with points within the cell nearest to the segment 2410. A cell 2442 is a two-segment cell, with points within the cell nearest to either the segment 2406 or the segment 2410. Distances within the cell can be reconstructed using a two-segment reconstruction method. A cell 2444 is a corner cell, where points within the cell are nearest to either the corner 2412, the segment 2406, or the segment 2408. A cell 2446 is also a corner cell, where points within the cell are nearest to either the corner 2414, the segment 2408, or the segment 2410. Distances within the cell 2444 and, the cell 2446 can be reconstructed using a corner cell reconstruction method.

Cells 2448, 2450, and 2452 are exterior cells, i.e., cells outside of the portion of the object 2401 that lie beyond a minimum distance from the boundary of the object 2401. If an accurate representation of the distance field is not needed beyond the minimum distance, then distances at points in cells 2448, 2450, and 2452 can be approximated by simpler reconstruction methods. For example, the distances at points can be reconstructed from nine sampled distance values using a bi-quadratic reconstruction method, thereby decreasing memory and computation time.

An advantage of the partitioning illustrated in FIG. 24D is that the cells have simple boundaries and hence are quickly and easily rasterized and located during rendering. A second advantage is that the quadtree provides a spatial data structure that enables fast queries of the distance field. An advantage over the configuration of FIG. 24C is that simple reconstruction methods, e.g., one-segment or bi-quadratic reconstruction methods, are used for some points in the region and more complex methods, e.g., two-segment and corner reconstruction methods, are only used when necessary, thereby decreasing computation time. A disadvantage is that there are more cells in the configuration of FIG. 24D than in the configurations of FIGS. 24B and 24C.

As illustrated by the examples shown in FIGS. 24B, 24C, and 24D, when specialized cell types are used, there are many optimal configurations of cells for partitioning a distance field representing an object. When generating a configuration, defining 'optimal' depends on many factors, including how the configuration is rendered, edited, and processed.

By optimal configuration, we mean a configuration that balances a set of desired characteristics of a cell-based distance field representation. An optimization of the configuration can be guided by minimizing a size of the distance field, minimizing a time required to render the distance field, minimizing a time to generate the distance field, maximizing a quality metric of a rendering of the distance field, minimizing a cell count, and maximizing an accuracy of the distance field, to name but a few.

Figure 25:
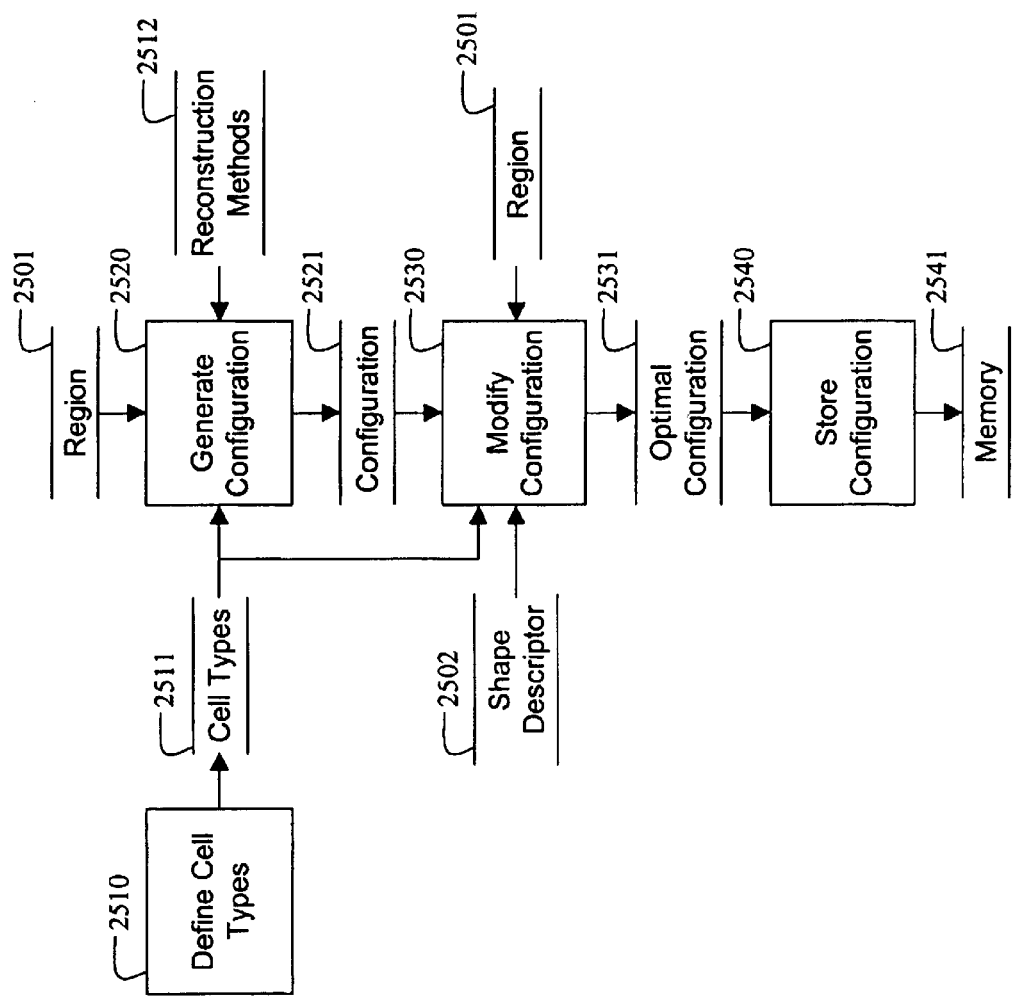
FIG. 25 is a flow diagram of a method for generating an optimal configuration of a distance field for a region of a shape descriptor representing an object according to the invention.

FIG. 25 illustrates a method 2500 for generating a cell-based distance field for a region 2501 of a shape descriptor 2502 representing an object. A set of cell types 2511 is defined 2510, where the cell types can include bi-linear and bi-quadratic cell types as well as various specialized cell types including corner cell types and two-segment cell types to name but a few.

The method 2500 generates 2520 a configuration 2521 of a set of cells for the region 2501, where each cell in the set of cells has a particular cell type, as defined by the set of cell types 2511, and a reconstruction method 2512 for reconstructing the distance field within the cell. The configuration 2521 of the set of cells is modified 2530 using the shape descriptor 2502, the region 2501, and the set of cell types 2511 until an optimal configuration 2531 for the set of cells of the region 2501 is reached. The optimal configuration 2531 of the set of cells is stored 2540 in a memory 2541 to generate the cell-based distance field.

Unlike the prior art top-down and bottom-up generation methods described by Frisken et al., the configuration according to the present invention can provide either a complete tessellation or an incomplete tessellation of the region 2501. For example, according to the present invention, both the configuration 2521 and the optimal configuration 2531 can cover a subset of the region, leaving areas of the region where the distance field is not represented, or a superset of the region, providing a representation of the distance field outside of the region. Unlike the prior art methods, cells in the present invention can overlap each other, providing additional opportunities to generate an optimal configuration.

The prior art methods are not guided by optimization criteria and therefore do not produce optimal configurations in any sense. The prior art applies strictly deterministic methods, resulting in configurations that are often restricted and sub-optimal. The prior art also does not consider specialized cells during generation.

To achieve an optimal configuration according to the present invention, both the generating 2520 and the modifying 2530 of the configuration 2521 of the set of cells can be done manually by a user, automatically by a computer, or semi-automatically, i.e., by computer with input from the user. The modifying 2530 can change the configuration 2521 of the set of cells by adding or deleting cells from the configuration 2521 of the set of cells or by changing attributes of a particular cell such as the geometry, the location, the orientation, and the type of the particular cell. Both the generating 2520 and the modifying 2530 can be performed using deterministic methods or non-deterministic methods including probabilistic methods and randomized methods.

In one embodiment, the generating 2520 places a single cell at an arbitrary or predetermined location in the region 2501 and the modifying 2530 adjusts the cell to an optimal shape and size. The modifying 2530 then adds new cells in uncovered areas of the region 2501, adjusting each of these to optimal shapes and sizes, and repeats this process until an optimal configuration 2531 is achieved. In another embodiment, the generating 2520 places an initial set of corner cells near corner points of the shape descriptor 2502 and the modifying 2530 tessellates the remaining uncovered area of the region 2501 to determine another optimal configuration 2531. Both of these embodiments provide an optimal configuration 2531 that is not possible with the prior art methods of Frisken et al.

In another embodiment, the generating 2520 can include preprocessing the shape descriptor 2502 to produce a set of preprocessed shape descriptors and a corresponding set of preprocessed distance procedures that can be used to accelerate both the generating 2520 and the modifying 2530.

For example, the preprocessing can determine boundary descriptors from the shape descriptor, partition the boundary descriptors into a set of segments delimited by features of the boundary descriptors. The features can include corner points, points along the boundary descriptors with substantial curvature, endpoints of the boundary descriptors, and points of substantial accumulated curvature as described above. The features can be changed during the modifying 2530 by adding, deleting, and altering a particular feature. When the features are changed during the modifying 2530, the set of preprocessed shape descriptors and the set of preprocessed distance procedures can be adapted accordingly.

Font Rendering

In today's font rendering engines, fonts are predominantly represented as outlines, which are scaled as needed to match the desired output size. While most high-resolution printers use bi-level rendering, modern display devices more commonly use grayscale rendering or a combination of grayscale and bi-level rendering at small point sizes.

A common approach for rasterizing grayscale glyphs involves scaling and hinting their outlines. The scaled and hinted outlines are scan converted to a high-resolution image, typically four or sixteen times larger than the desired resolution. Then, the high-resolution image is down-sampled by applying a filtering method, e.g., a box filter, to produce the final grayscale image.

For body type, individual glyphs can be rasterized once and stored in a cache as a grayscale bitmap for reuse in a preprocessing step. The need for sub-pixel placement of a glyph may require several versions of each glyph to be rasterized. Use of a cache for body type permits higher quality rendering with short delays, e.g., ½ second, during tasks such as paging through an Adobe Acrobat PDF document.

However, type rendered on arbitrary paths and animated type precludes the use of a cache and therefore must be generated on demand. Real-time rendering requirements can force the use of a poor filter, e.g., box filtering with four samples per pixel, and can preclude the use of hinting. This can cause spatial and temporal aliasing as well as baseline jitter and inconsistent stroke weights. The aliasing can be reduced using hinted device fonts residing in system memory. However, maintaining real-time frame rates places severe constraints on how hinted device fonts can be used, e.g., hinted device fonts cannot be scaled or rotated dynamically.

Recent work at Microsoft on ClearType has led to special treatment for LCD color displays that contain a repeating pattern of addressable colored sub-pixels, i.e., components. Platt, in "Optimal Filtering for Patterned Displays," *IEEE Signal Processing Letters*, 7(7), pp. 179–180, 2000, describes a set of perceptually optimal filters for each color component. In practice, the optimal filters are implemented as a set of three displaced box filters, one for each color.

ClearType uses prior art hinting and coverage based antialiasing methods to determine the intensity of each component of each pixel and thus has all of the disadvantages described above. In contrast, our distance field based method uses the distance field to determine the intensity of each component of each pixel, and does so using fewer samples. Our ADF antialiasing method described below can replace the box filters to provide better emulation of the optimal filters with fewer samples per pixel.

Antialiasing

Understanding appearance artifacts in rendered fonts requires an understanding of aliasing. Typically, a pixel is composed of discrete components, e.g., a red, green, and blue component in a color printer or display. In a grayscale device, the pixel is a single discrete component. Because pixels are discrete, rendering to an output device is inherently a sampling process. The sampling rate is dependent on the resolution of the device. Unless the sampling rate is at least twice the highest (Nyquist) frequency in the source signal, the sampled signal exhibits aliasing.

Edges, e.g., glyph outlines, have infinite frequency components. Hence, edges cannot be represented exactly by sampled data. Inadequate sampling of edges results in jaggies, which tend to crawl along the sampled edges in moving images. If the source signal also contains a spatial pattern, e.g., the repeated vertical stems of an 'm' or the single vertical stem of an 'i', whose frequency components are too high for the sampling rate, then the sampled data can exhibit dropout, moiré patterns, and temporal flicker.

To avoid aliasing, the input signal must be pre-filtered to remove frequency components above those permitted by the sampling rate. In general, there are two approaches to pre-filtering.

The first is known as analytic filtering. It applies some form of spatial averaging to a continuous representation of the source signal before sampling. Unfortunately, analytic filtering is often not possible, either because the source data are not provided as a continuous signal, which is the normal case for image processing, or because determining an analytic description of the signal within the filter footprint is too complex. This is the case for all but simple geometric shapes in computer graphics and certainly the case for spline-based outlines.

The second approach is known as discrete filtering. In that approach, the source signal is typically sampled at a higher rate than the target rate to obtain a supersampled image. Then, a discrete filter is applied to reduce high frequencies in the supersampled image before down-sampling the image to the target rate. The discrete approach is referred to as regular supersampling in computer graphics.

Various discrete filters can be applied depending on the processing budget, hardware considerations, and personal preferences for contrast versus smoothness in the output image. The box filter typically used to render type simply replaces a rectangular array of supersampled values with their arithmetic average and is generally regarded as inferior in the signal processing community.

In another approach, adaptive supersampling focuses available resources for sampling and filtering on areas of the image with higher local frequency components. Optimal adaptive sampling can be determined from the local variability in the image. However, the usefulness of this technique is limited by the need to estimate the local variance of the image, a process that can be computationally expensive.

Moiré patterns, due to inadequate regular sampling of high frequency patterns, are particularly objectionable to the human visual system. In general image processing, stochastic or jittered sampling has been used to solve this problem. With stochastic sampling, the samples are randomly displaced slightly from their nominal positions. Stochastic sampling tends to replace moire pattern aliasing with high frequency noise and has been shown to be particularly effective in reducing temporal aliasing.

Rendering with Distance-Based Antialiasing

The infinite frequency components introduced by edges of a glyph are a major contribution to aliasing in prior art font rendering. In contrast, by using 2D distance fields to represent 2D objects and then sampling the 2D distance fields according to the invention, we avoid such edges because the representation is $C^0$ continuous. Instead, a maximum frequency depends on a spatial pattern of the glyph itself, e.g., the repeated vertical stems of an 'm' or the single vertical stem of an 'i'.

By representing the glyph by its 2D distance field, we are effectively applying an analytic pre-filter to the glyph. Our antialiasing methods for rendering distance fields as described below yield an output that is different from the output of a conventional analytic pre-filter.

Antialiasing with Distance Fields

FIG. 4 shows a method 400 for antialiasing, in image-order, an object 401, e.g., a glyph, represented 410 as a two-dimensional distance field 411. Each pixel 402 can include one or more components 404, typically a red, blue, and green component for a 'RGB' type of output device. This method can use one or more samples for each component 404 of each pixel 402. The method 400 provides adaptive distance-based super sampling, distance-based automatic hinting, and distance-based grid fitting. The resulting antialiased pixel intensity can be rendered on CRT and LCD-like displays as part of an image. The method is particularly useful for rendering motion blur.

A set 403 of sample points 407 in the two-dimensional distance field 411 representing the object 401 is associated 420 with each component 404 of each pixel 402. A distance (D) 405 is determined 430 from the two-dimensional distance field 411 and the set of sample points 403. Then, the distance 405 is mapped 440 to an antialiased intensity (I) 406 of the component 404 of the pixel 402.

In the preferred embodiment, the glyph 401 is represented 410 by a bi-quadratic ADF 411, as described above. This makes it efficient to apply distance-based antialiasing during font rendering. Other representations such as a two-dimensional distance map, a two-dimensional distance shell, an optimal ADF including specialized cells, and a procedural distance field can also be used.

For each component 404 of each pixel 402 in an image, a cell, e.g., a leaf cell, containing the component 404 is located using a quadtree traversal method described in U.S. patent application Ser. No. 10/209,302, filed on Jul. 31, 2002 and titled "Method for Traversing Quadtrees, Octrees, and N-Dimensional Bi-trees," incorporated herein by reference in its entirety. Although other traversal methods known in the art can be used with our invention, the aforementioned method is comparison-free and therefore executes efficiently. The distance at the component 404 is reconstructed from the cell's distance values and mapped 440 to the antialiased intensity (I) 406.

Different mappings can be used, including linear, Gaussian, and sigmoidal functions. Selection of the best mapping function is subjective. In one embodiment, our mapping is a composition of two functions. The first function is as described above, the second is a contrast enhancement function. These two functions are composed to map 440 the distance field (D) 405 to the antialiased intensity (I) 406 of the component 404.

FIG. 5 shows a linear mapping 500 of intensity 501, e.g., [0,1], as a function of distance 502. The mapping converts a distance to an antialiased image intensity for each component of the pixel. Distances are positive inside the object and negative outside the object. Different cutoff values 503 and 504 affect the edge contrast and stroke weight. We achieve good results with outside 503 and inside 504 filter cutoff values of (−0.75, 0.75) pixels for display type, and (−0.5, 0.625) pixels for body type.

The mapping 440 can be chosen with a user interface that allows a display manufacturer to tune the mapping 440 for their displays. Similarly, the user interface can be provided at an application or operating system level to enable each user the ability to optimize the mapping 440 to their personal preferences.

Optimal Distance-Based Adaptive Supersampling

The above described distance-based antialiasing method reduces aliasing due to glyph edges. However, aliasing artifacts still occur when stem widths or spacing between glyph components are too small for the display's sampling rate. In such cases, we apply distance-based adaptive supersampling as described below to further reduce spatial and temporal aliasing.

In the preferred embodiment, we use bi-quadratic ADFs with our novel distance-based adaptive supersampling to provide significant advantages over prior art outline-based representations and coverage-based adaptive supersampling methods. Because ADFs use detail-directed sampling, regions of the distance field with higher local variance are represented by smaller leaf cells. Hence, the structure of the ADF quadtree provides the map of local variance required to implement optimal distance-based adaptive sampling, overcoming the difficulty in the prior art adaptive supersampling antialiasing methods of determining the local variance as described above.

For each component 404 of each pixel 402 in the image, the cell containing the component 404 is located, and a set 403 of sample points 407 within a filter radius, r, of the component is associated 420 with the pixel component 404. The number of sample points 407 per component (spc) depends on the relative size of the cell (cellSize) to r. Sampled distances at the sample points 407 are filtered to determine 430 a single weighted average distance 405 that is then mapped 440 to an antialiased intensity 406 of the component 404 of the pixel 402.

Various filters and sampling strategies are possible. In the preferred embodiment we use a general form of a Gaussian filter, weighting each distance sample by $W^{-1}2^{-3(d/r)^2}$, where d is the distance from the sample point to the component of the pixel and W is the sum of the weights used for that component. Similar results can be obtained with box filters, cone filters, negative lobe filters, and other forms of the Gaussian filter.

Figure 6C:
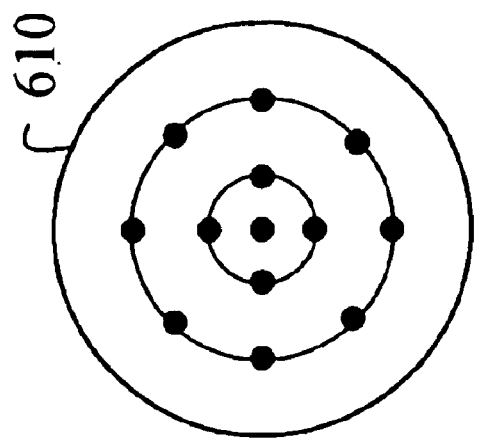
FIGS. 6A, 6B, and 6C are diagrams of samples near a component of a pixel.
Figure 6B:
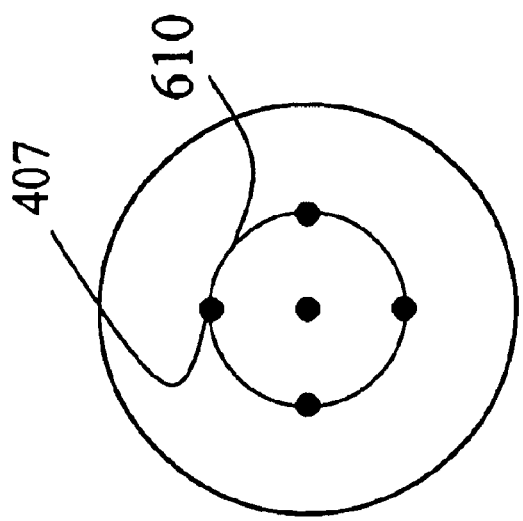
Figure 6A:
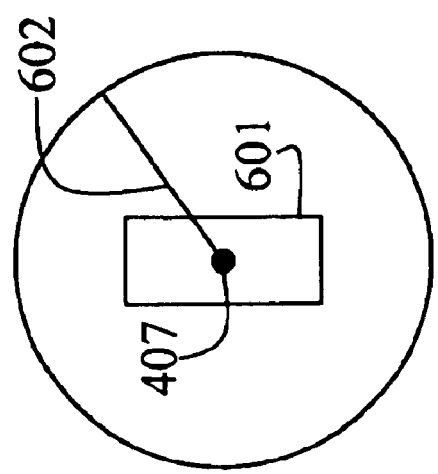

FIGS. 6A–C shows our sampling strategy. Samples 407 are placed in concentric circles 610 near the component 601 for efficient computation of the weights and weight sums. We use a filter radius r 602 of 1.3 times the inter-pixel spacing and sample with 1 spc when cellSize>r (FIG. 6A), 5 spc when r/2<cellSize≦r (FIG. 6B), and 13 spc when cellSize ≦r/2 (FIG. 6C).

Rather than concentric circles, the invention can use numerous other strategies to associate sample points 407 with pixel components 404. Our method is not particularly sensitive to the exact sampling strategy.

Another adaptive sampling strategy, described below, places sample points at the centers of all the cells contained within the filter radius r. This strategy has equally good results.

Cell-Based Antialiasing

The distance field antialiasing methods described above can be implemented in software using scanline-based rasterization. Alternatively, distance fields partitioned into cells, e.g., a bi-quadratic ADF or an optimal ADF including specialized cells, can be antialiased cell-by-cell, i.e., in object-order. Cell-based rendering eliminates tree traversal for locating cells containing the sample points, eliminates redundant setup for computing distances and gradients within a single cell, and reduces repeated retrieval, i.e., memory fetches, of cell data.

In addition, because the cells required for rendering can be represented as a sequential block of fixed sized, self-contained units, i.e., distances and gradients for points within a cell are determined from the cell's distance values, our cell-based approach is amenable to hardware implementations, enabling real-time rendering.

Figure 7:
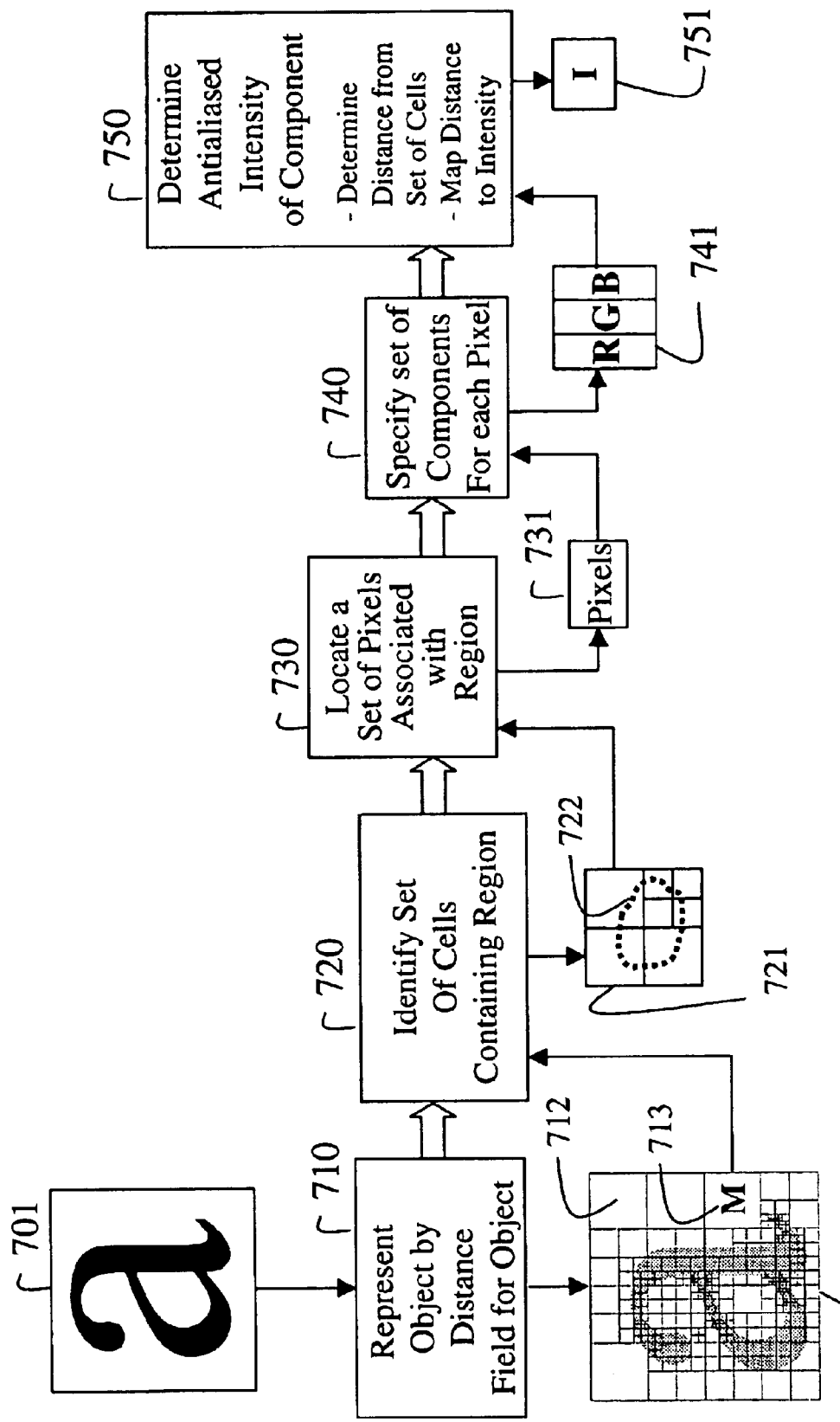
FIG. 7 is a flow diagram of a method for antialiasing an object in object-order according to the invention.

FIG. 7 shows a method 700 for antialiasing an object 701, e.g., a glyph, represented 710 as a two-dimensional distance field 711 in object-order. The method 700 provides adaptive distance-based super sampling, distance-based automatic hinting, and distance-based grid fitting. The resulting antialiased pixel intensity can be rendered on CRT and LCD-like displays as part of an image. The method is particularly useful for rendering motion blur. We can use mipmapping when the cells of the two-dimensional distance fields 711 are organized in a spatial hierarchy to reduce the number of distance samples required.

The two-dimensional distance field 711 is partitioned into cells 712. In a preferred embodiment where we use bi-quadratic, adaptively sampled distance fields, the size of each cell is dependent on a local variance of the two-dimensional distance field. Each cell includes a method (M) 713 for reconstructing the two-dimensional distance field within the cell. A set of cells 721 containing a region (dashed line) 722 of the distance field to be rendered is identified 720.

The region 722 is used to locate 730 a set of pixels 731 associated with the region. A set of components 741 for each pixel in the set of pixels 731 is specified 740. Then, antialiased intensities 751 are determined 750 for each component of each pixel from distances in the set of cells. Here, the distances are reconstructed from the set of cells. The distances are then mapped to the antialiased intensity, as described above.

In one embodiment, we can determine the distance by locating a single sample point within the set of cells near the component of the pixel and reconstructing the distance at the single sample point from the set of cells. In this embodiment, the two-dimensional distance field 711 can be represented as an optimal ADF including specialized cells.

In our preferred embodiment where we use bi-quadratic adaptively sampled distance fields, this approach is augmented with a special treatment of cells smaller than the filter radius for adaptive distance-based supersampling. Because small cells occur where there is high variance in the distance field, distances in pixels near these cells can be pre-filtered before mapping the distances to intensity.

We initialize a compositing buffer of elements, where each element corresponds to a component of each pixel of the set of pixels. Each cell in the set of cells can be processed independently. In the preferred embodiment, each element consists of a weighted distance and an accumulated weight which are both initialized to zero. When a cell is processed, these weighted distances and accumulated weights are incremented in the buffer elements that correspond to pixel components which lie either within the cell or within a filter radius of the cell's center.

After processing all the cells, the weighted distances are normalized by the accumulated weight for each component of each pixel to produce the distance that is then mapped to the antialiased component intensity. In the preferred embodiment, we use the same Gaussian weights and filter radius as described above.

Our cell-based rendering described thus far always processes every leaf cell in the set of cells, regardless of the relative sizes of each cell to the filter radius. In theory, this provides optimal adaptive distance-based supersampling. In practice, the ADF quadtree can be used as a mipmap to reduce the number of cells.

The ADF quadtree structure allows us to replace small leaf cells with their ancestors, effectively truncating the quadtree at some predetermined cell size. As long as this cell size is less than or equal to ¼ of the inter-pixel spacing, there is no visual degradation in the adaptive distance-based supersampling results. This reduces the number of cells to render the region.

Rendering Overlapping Objects Represented as Two-Dimensional Distance Fields

The present invention provides methods and apparatuses for rendering overlapping objects represented as two-dimensional distance fields that avoid the problems in the prior art. In particular, rather than blending color or intensity values derived from coverage-based antialiasing and rather than combining the overlapping objects into a single composite object prior to rendering, the present invention combines distance values that are determined on-demand during rendering for a component of a pixel. A combined distance is then mapped to determine an antialiased intensity of the component of the pixel.

Figure 14A:
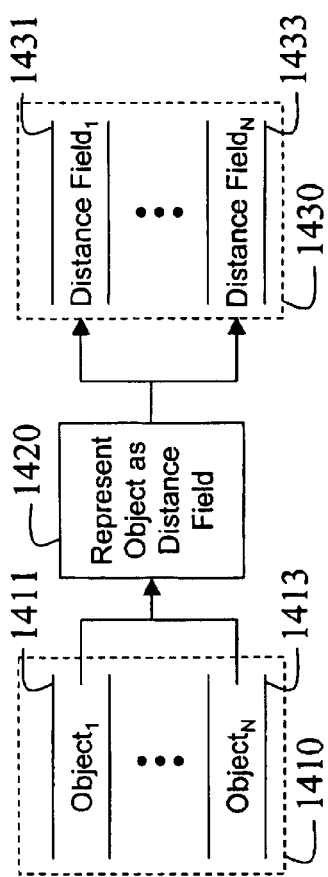
FIG. 14 is a flow diagram of a method for antialiasing a set of objects in image-order according to the invention.
Figure 14B:
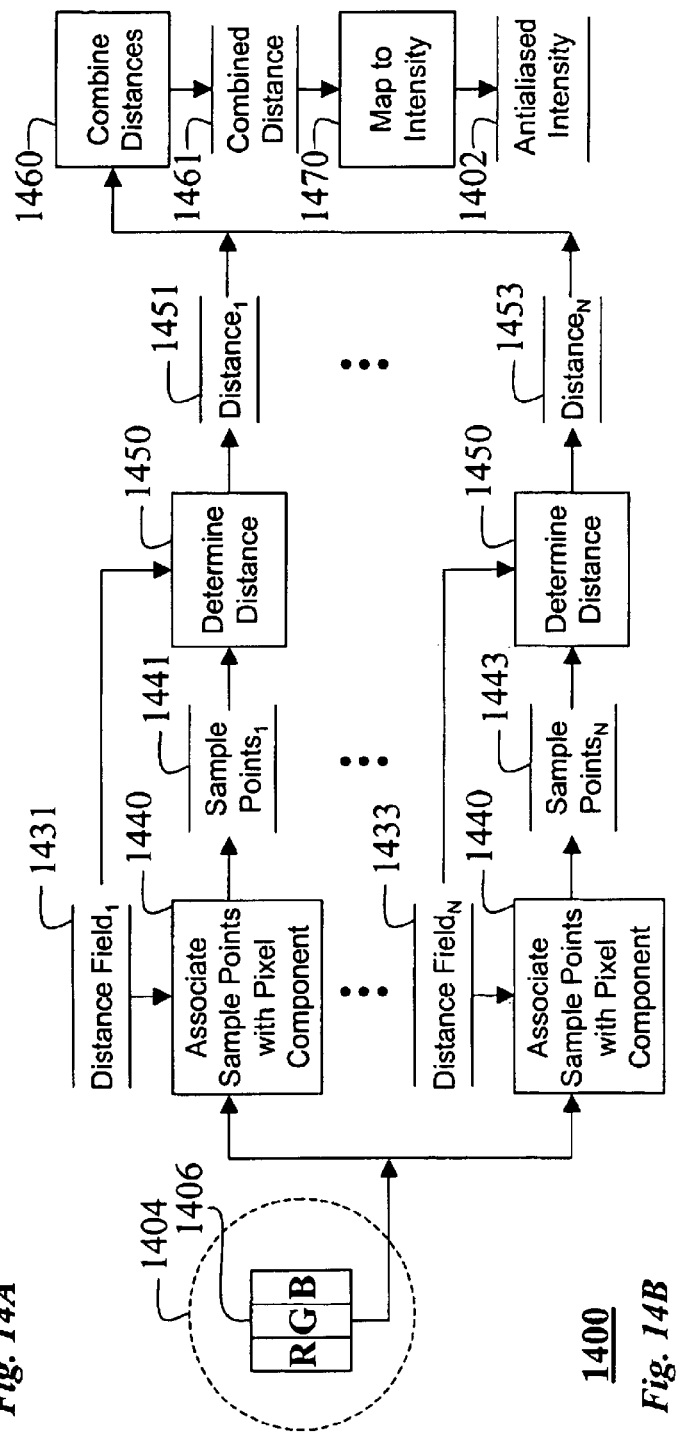

FIGS. 14A and 14B show a method 1400 for rendering, in image-order, a set of objects 1410. Referring to FIG. 14A, the set of objects 1410 is represented 1420 by a set of two-dimensional distance fields 1430, there being one distance field for each object, e.g., a distance field 1431 corresponds to an object 1411, and a distance field 1433 corresponds to an object 1413.

As shown in FIG. 14B, each pixel 1404 can include one or more components 1406, typically a red, green, and blue component for RGB rendering. The method 1400 determines an antialiased intensity 1402 of a component 1406 of a pixel 1404. Sets of sample points 1441–1443 are associated 1440 with the pixel component 1406, there being a one-to-one correspondence between each set of sample points and each distance field in the set of two-dimensional distance fields 1430. For example, the set of sample points 1441 corresponds to the distance field 1431 and the set of sample points 1443 corresponds to the distance field 1433.

A corresponding distance is then determined 1450 for each distance field 1431–1433 using its corresponding set of sample points 1441–1443, producing corresponding distances 1451–1453. For example, the corresponding distance 1451 is determined 1450 for the distance field 1431 using its corresponding set of sample points 1441.

The corresponding distances 1451–1453 are then combined 1460 to determine a combined distance 1461. The combined distance 1461 is then mapped 1470 to determine the antialiased intensity 1402 of the component 1406 of the pixel 1404.

FIGS. 15A, 15B, and 15C show a method 1500 for rendering, in object-order, a set of objects 1510. Referring to FIG. 15A each object 1511–1513 in the set of objects 1510 is represented 1501 by a corresponding two-dimensional distance field 1521–1523. The corresponding two-dimensional distance fields 1521–1523 constitute a set of two-dimensional distance fields 1520. For example, the distance field 1521 corresponds to the object 1511 and the distance field 1523 corresponds to the object 1513.

Referring to FIG. 15B, each distance field 1521–1523 in the set of two-dimensional distance fields 1520 is partitioned 1525 into cells, where each cell is associated 1530 with a method for reconstructing 1531 the two-dimensional distance field within the cell.

As shown in FIG. 15C, to render a region 1545 of the set of objects 1510, a set of pixels 1551 is located 1550 and a set of components 1560 for each pixel in the set of pixels 1551 is specified 1555. Note that each pixel in the set of pixels 1551 can include one or more components, typically a red, green, and blue component for RGB rendering. The method 1500 determines an antialiased intensity 1566 for each component 1561 of each pixel in the set of pixels 1551.

For each two-dimensional distance field 1521–1523 in the set of two-dimensional distance fields 1520, a corresponding set of cells 1541–543 associated with the region 1545 is identified 1540, e.g., the set of cells 1541 is identified 1540 for the distance field 1521 and the set of cells 1543 is identified 1540 for the distance field 1523.

For each component 1561 of each pixel in the set of pixels 1551, an antialiased intensity 1566 is determined 1565 by first determining 1570, for the component 1561, a corresponding distance 1571–1573 for each distance field 1521–1523 using the corresponding set of cells 1541–1543. For example, the corresponding distance 1571 is determined 1570 for the component 1561 for the distance field 1521 using the set of cells 1541.

The corresponding distances 1571–1573 are then combined 1575 to determine a combined distance 1576. The combined distance 1576 is then mapped 1580 to produce the antialiased intensity 1566 of the component 1561 of the pixel.

Unlike the prior art, which renders overlapping regions by blending or combining color or intensity values of the rendered objects or by combining coverage-based antialiased values, the methods 1400 and 1500 combine distance values, thus mitigating color artifacts and blending artifacts exhibited by the prior art.

Unlike the prior methods of Perry et al., the methods 1400 and 1500 do not generate a combined distance field to represent the composite object prior to rendering. Instead, according to our present invention, a combined distance is determined on-demand during rendering for a component of a pixel by combining distances determined for the component.

There are several methods for combining 1460 the corresponding distances 1451–1453 and combining 1575 the corresponding distances 1571–1573. For example, using a positive-inside, negative-outside sign convention for the distance fields, the combining can take a maximum of the corresponding distances to produce a union of the objects or a minimum of the corresponding distances to produce an intersection of the objects. Other combining methods include taking a difference, performing an arithmetic average, or performing an implicit blend of the corresponding distances, to name but a few.

An implicit blend can be used to round corners between the objects while an arithmetic average can be used to provide additional antialiasing by further reducing high frequency content in the rendered region. More generally, the combining can be any arithmetic or conditional operation. Furthermore, the combining can use a procedure or a table to determine the combined distance.

Rendering Cell-Based Distance Fields Using Texture Mapping

The present invention can render a distance field representing an object, such as a two-dimensional glyph, using texture mapping, where the texture mapping constitutes one stage in a multi-stage rendering pipeline. We first provide an overview of each stage of the rendering pipeline, and then describe specific details of various stages along with several embodiments of the invention.

FIGS. 16A and 16B show a method 1600 for rendering a distance field 1602 representing an object 1603 according to the invention.

As shown in FIG. 16A, the distance field 1602 is partitioned into a set of cells 1606, where each cell 1604 includes a set of distance samples 1605 and a method for reconstructing the distance field 1602 within the cell 1604 using the distance samples 1605.

A region 1601 of the distance field 1602 representing the object 1603 is defined. To render the region 1601, we proceed to a first stage in the rendering pipeline, and then to subsequent stages in order.

The first stage selects 1610 a set of source cells 1611 from the set of cells 1606 of the distance field 1602. The selection 1610 enables a rendering of the region 1601. For example, the set of source cells 1611 covering the region 1601 can be selected 1610.

In FIG. 16B, a second stage represents 1620 each source cell 1612 in the set of source cells 1611 as a geometric element 1621 defined in a world coordinate system. Each geometric element 1621 is associated 1622 with a texture map 1623, where the texture map 1623 includes distance samples 1605 of the corresponding source cell 1612.

The geometric element 1621 can be described as a quadrilateral, a triangle, a polygon, a set of control vertices constituting a shape with curved edges, to name but a few. The description of the geometric element 1621 is typically chosen to match the geometry of the corresponding source cell 1612, although the present invention is not limited to this approach.

A third stage transforms 1630 each geometric element 1621 from the world coordinate system to a geometric element 1631 in a pixel coordinate system. There are many ways to perform the transformation 1630 as described below.

A fourth stage texture maps 1640 each geometric element 1631 to determine a distance 1641 for each component 1642 of each pixel 1643 associated with the geometric element 1631. The texture mapping 1640 involves rasterizing the geometric element 1631 to produce pixels 1643 associated with the geometric element 1631 and then determining "colors" of the pixels 1643. In actuality, in the present invention, the colors of the pixels 1643 represent distance values 1641 of the components 1642 of the pixels 1643. The texture mapping 1640 uses the distance samples 1605 stored in the texture map 1623 to perform a reconstruction of the distance field 1602 within the geometric element 1631 for each component 1642 of each pixel 1643 associated with the geometric element 1631.

In a fifth and final stage of the rendering pipeline, we map 1650 the distance 1641 of each component 1642 of each pixel 1643 to an antialiased intensity 1651 of the component 1642 of the pixel 1643.

The stages of the multi-stage rendering pipeline can be implemented on a central processing unit, an application specific integrated circuit, fixed-function graphics hardware, programmable graphics hardware, and various combinations, to name but a few.

Programmable graphics hardware, see *Real-Time Rendering*, Akenine-Moller and Haines, A K Peters, 2002, ISBN 1-56881-182-9, allows the transforming 1630, the texture mapping 1640, and the mapping 1650 stages of our multi-stage rendering pipeline to be controlled by vertex and pixel shaders. A vertex shader defines a procedure that operates on a geometric element to produce a transformed geometric element. A pixel shader receives rasterized pixels that can then be manipulated, e.g., colorized, before their eventual arrival to a frame buffer. Vertex and pixel shaders provide enormous flexibility when rendering an object.

In the present invention, we can exploit both types of shaders to perform various aspects of our rendering pipeline. For example, the transforming 1630 can be performed by a vertex shader, the texture mapping 1640 can be performed by a pixel shader, and the mapping 1650 can be performed by a pixel shader.

The texture mapping 1640 can perform various interpolation methods to determine the distance 1641 for each component 1642 of each pixel 1643 such as bi-linear interpolation, tri-linear interpolation, bi-quadratic interpolation, high-order, e.g., bi-cubic, interpolation, to name but a few. The texture mapping 1640 either approximates the distance 1641 for each component 1642 of each pixel 1643, thereby producing a less faithful rendering of the object 1603, or determines the distance 1641 for each component 1642 of each pixel 1643 exactly. An approximation method can be used when the method of reconstruction for a source cell 1612 is too complicated to implement or requires too much time to execute.

When multiple texturing units are available, the texture mapping 1640 can determine the distance 1641 of each component 1642 of each pixel 1643 concurrently and independently, thereby rendering the object 1603 efficiently.

The mapping 1650 can use one-dimensional texture mapping to determine the antialiased intensity 1651 for each component 1642 of each pixel 1643. This one-dimensional texture mapping can be used to approximate a filter function. The mapping 1650 can also use a lookup table or a pixel shader to determine the antialiased intensity 1651 for each component 1642 of each pixel 1643.

When rendering multiple distance fields representing multiple objects or when rendering composite glyphs represented by a set of distance fields, the distance fields can overlap and must be treated appropriately, see above.

Figure 16C:
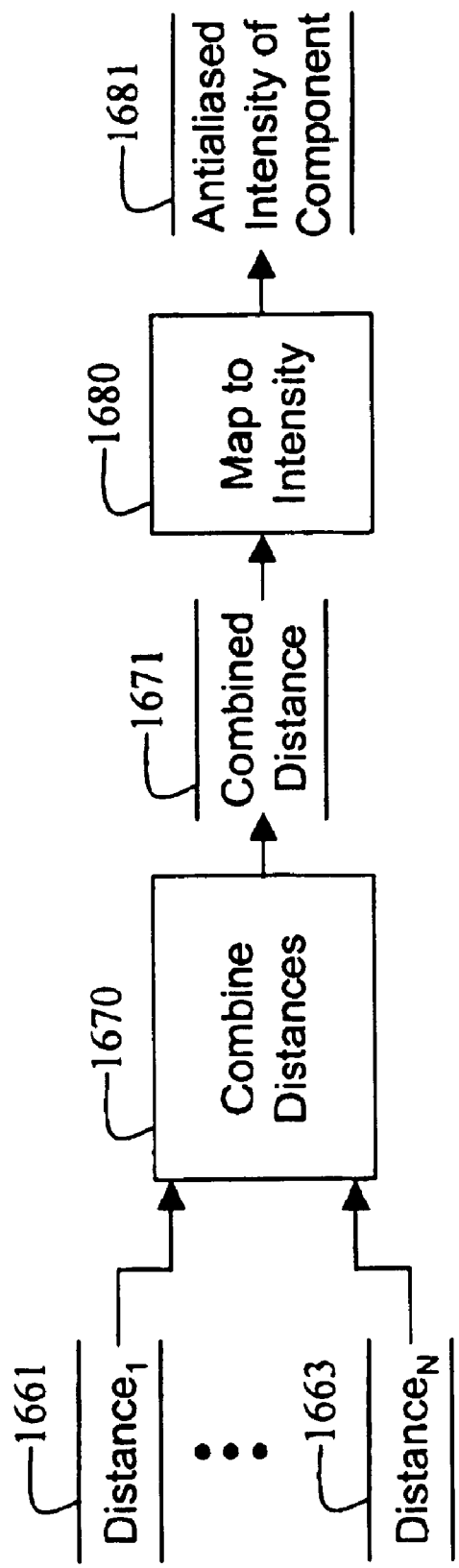
FIG. 16 is a flow diagram of a method for rendering cell-based distance fields using texture mapping according to the invention.

FIG. 16C shows an embodiment including additional steps for the method 1600 of the present invention to properly handle overlap conditions. A combining step 1670 is performed after the texture mapping 1650. In this embodiment, we combine 1670 distances 1661–1663, determined by the texture mapping 1640, for each component 1642 of each pixel 1643 to determine a combined distance 1671. We then map 1680 the combined distance 1671 of each component 1642 of each pixel 1643 to an antialiased intensity 1681 of the component 1642 of the pixel 1643.

Unlike the present invention, prior art font rendering cannot effectively render high-quality glyphs using hardware. Prior art hinting is too complicated, with many branches in the execution flow and complicated data structures, to make hardware an effective solution.

Although the prior art uses texture mapping for many purposes, using texture mapping, according to our invention, to render a distance field representing an object is unique. Furthermore, the independent and concurrent determination of distance values for each component of each pixel, according to our invention, is novel.

Unlike the prior art, our invention enables a rendering of a specialized cell such as a corner cell or a two-segment cell of a distance field using a pixel shader to reconstruct the distance field within the cell.

Rendering Using a Progressive Cache-System Structure

Figure 17:
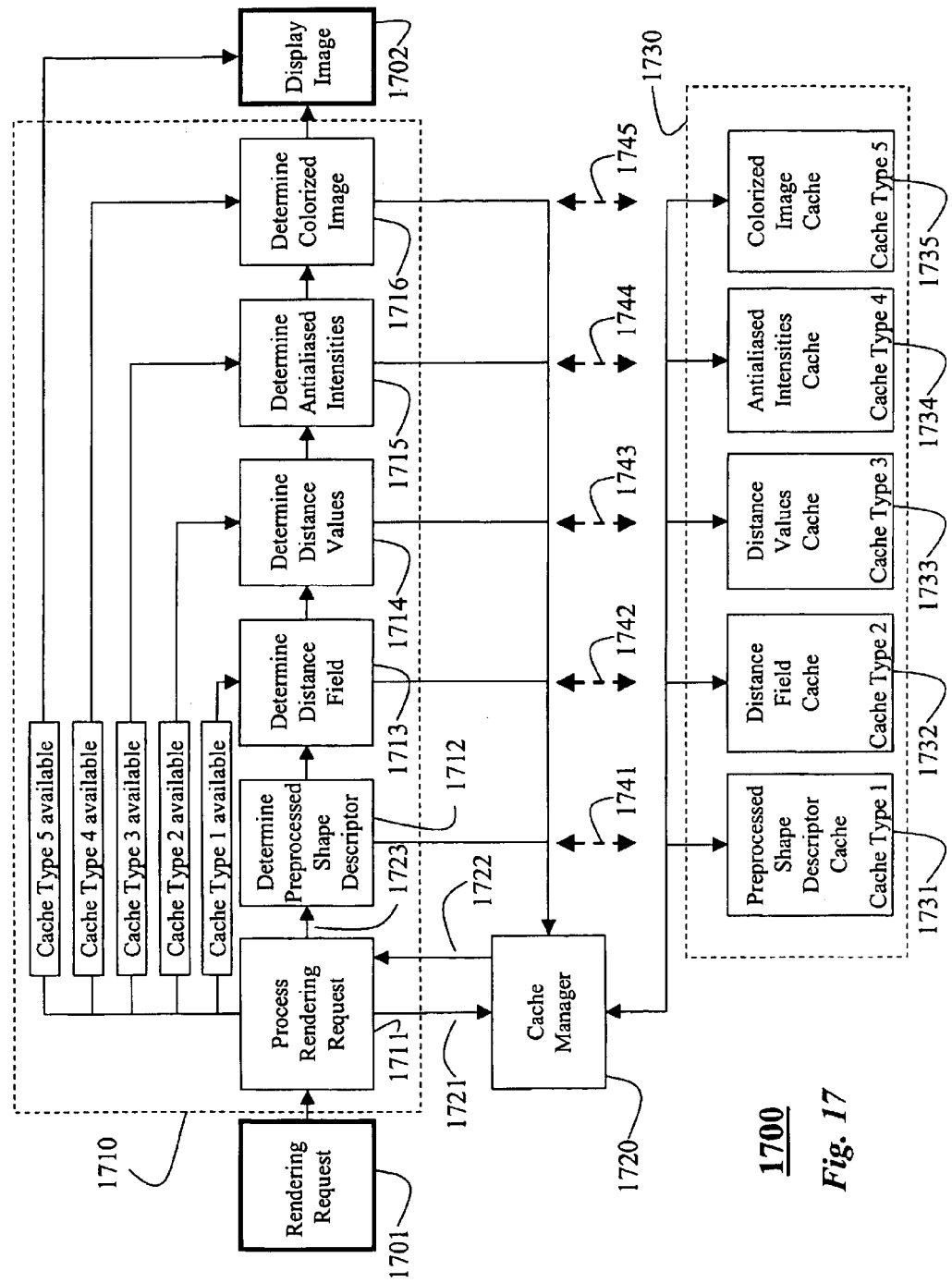
FIG. 17 is a flow diagram of a method for rendering according to the invention.

FIG. 17 shows a system 1700 for efficiently rendering a graphics object represented as a two-dimensional distance field. The system 1700 includes a rendering pipeline 1710, a cache manager 1720, and a progressive cache 1730.

The pipeline 1710 includes rendering stages 1711–1716 connected serially to each other. The first stage 1711 receives as input a rendering request 1701, and the last stage 1716 outputs a display image 1702. An output of each stage provides an input for a successive stage.

The cache manager 1720 connects the pipeline 1710 to the progressive cache 1730. The cache manager routes cache elements between the pipeline and the progressive cache.

The progressive cache 1730 includes a preprocessed shape descriptor cache 1731, a distance field cache 1732, a distance values cache 1733, an antialised intensities cache 1734, and a colorized image cache 1735. The progressive caches 1731–1735 are arranged, left-to-right in FIG. 17, from a least finished, i.e., least complete, cache element to a most finished, i.e., most complete, cache element, hence, the cache 1730 is deemed to be 'progressive'.

Each cache 1731–1735 includes a data store for input to a next stage of a corresponding stage in the rendering pipeline 1710 and for output of the corresponding stage. The one-to-one correspondences between the rendering stages of the pipeline and the data stores are indicated generally by the dashed double arrows 1741–1745. The stages increase a level of completion of elements passing through the pipeline, and there is a cache for each level of completion.

Rendering Using a Progressive Cache-System Operation

First, the rendering request 1701 for a graphics object is generated.

Second, the progressive cache 1730 is queried 1721 by the cache manger 1720 to determine a most complete cached element 1722 most representing the display image 1702, e.g., elements of cache types 1–5, which is available to satisfy the rendering request.

Third, a result of querying the progressive cache, i.e., the most complete cached element 1722, is sent, i.e., piped, to the appropriate rendering stage, i.e., the next stage of the corresponding stage of the cache containing the most complete cached element 1722, to complete the rendering of the object. If no cache element is available 1723, then processing of the rendering request commences in stage 1712.

After each rendering stage completes processing, the output of the stage can also be sent, i.e., piped, back to the progressive cache 1730, via the cache manger 1720, for potential caching and later reuse. For example, the output of stage 1716 is sent as input to the cache 1735.

Applying compression methods to cached elements in the progressive cache 1730 increases the effective size of the progressive cache 1730, thus increasing the overall efficiency of the pipeline 1710 by providing a greater cache hit ratio. The distance field cache 1732 and the distance values cache 1733 are particularly amenable to compression because of the continuous nature of distance fields.

There are numerous ways known in the art to store and locate cached elements in the individual caches 1731–1735. One such method is hashing, where a key is constructed from the rendering request 1701 and then hashed to produce an index indicating a location of a potentially cached element. When the rendering request 1701 comprises a glyph of a specified typeface, the key could comprise a bitwise concatenation of a character code for the glyph and a name for the typeface.

To increase the effectiveness of our progressive cache 1730, we can use a least-recently-used, i.e., LRU, method for managing cached elements. In this method, least-recently-used cached elements are discarded when the progressive cache 1730 becomes full. It is important to note, however, that our progressive cache 1730 can use various memory management methods for cached elements and is not limited to the LRU method.

In another embodiment of the system 1700, there are fewer caches in the progressive cache 1730 than there are stages in the rendering pipeline 1710. In this embodiment, not all stages have a corresponding cache. It is sometimes advantageous to eliminate an individual cache in the progressive cache 1730 because the corresponding stage is extremely efficient and caching the output in the individual cache would be unnecessary and would waste memory. Furthermore, the output of the corresponding stage may require too much memory to be practical.

One skilled in the art would readily understand how to adapt the system 1700 to include various rendering pipelines and various progressive caches to enable a rendering request to be satisfied.

Processing Pixel Components

A pixel comprises one or more components. For example, pixels on a typical CRT or LCD color monitor comprise a red, a green, and a blue component. In our invention, when the pixel includes multiple components, they can be treated independently, as described above, or processed as a single component. When the multiple components are processed as a single component, a color and an alpha value of the pixel can be determined from the antialiased intensity of the single component.

There are two reasons to process the multiple components as a single component. First, it reduces rendering times. Second, when the multiple components cannot be addressed individually or when the relative positions of the individual components are not known, individual treatment of each component is difficult.

When display devices, such as LCDs and OLEDs, have addressable pixel components, it is known in the art that processing the multiple components independently can increase the effective resolution of the device. Our invention can exploit this feature of such devices to provide distance-based antialiasing with superior quality over the prior art.

Figure 12:
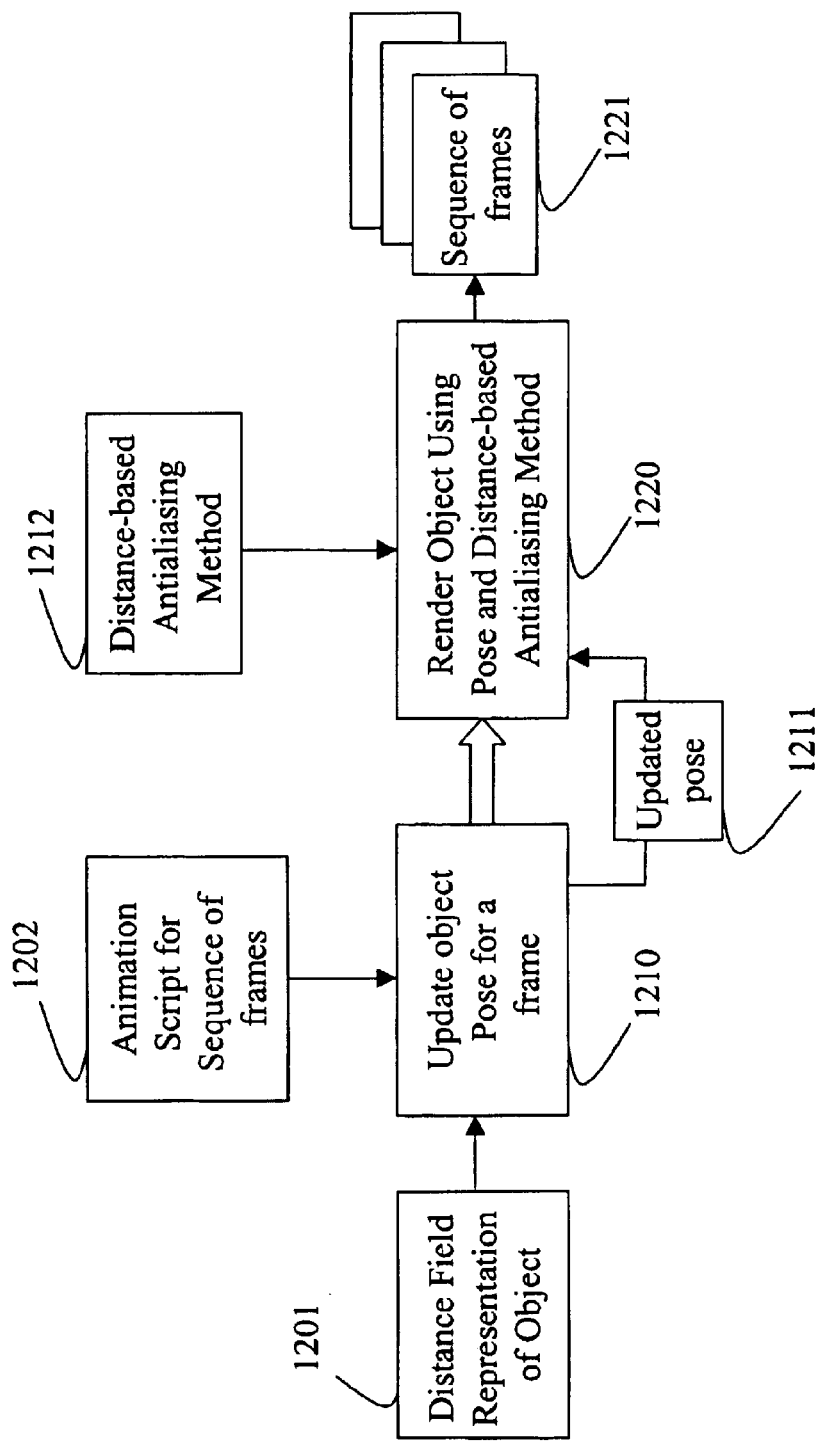
FIG. 12 is a flow diagram of a method for animating an object according to the invention.

When rendering on alternative pixel layouts with addressable pixel components our invention has numerous advantages over the prior art. For example, we can use a single distance sample per pixel component and achieve superior quality over the prior art, even when the prior art uses several coverage-based samples per pixel component. Our methods are inherently fast enough on any layout and do not require reusing samples like the prior art. In the prior art, the reuse of samples fails to work on many alternative pixel layouts. Furthermore, by adjusting our rendering parameters, such as the mapping 440 described with respect to FIG. 4, our methods mitigate the color fringing problems of the prior art and allow us to account for various characteristics of pixel components, such as size and brightness Animating Two-Dimensional Objects FIG. 12 shows a flow diagram of a method 1200 for animating an object 1201 as a sequence of frames according to an animation script 1202. The animation script 1202 directs conditions of the object, e.g., the position, size, orientation, and deformation of the object, for each frame in the sequence of frames. The object is represented as a two-dimensional distance field. A pose 1211 of the object 1201 is updated 1210 for each frame in the sequence of frames 1221 according to the animation script 1202. The object 1201 is rendered using the updated pose 1211 and a distance-based antialiasing rendering method 1212.

The two-dimensional distance field representing the object 1201 can be acquired from a different representation of the object, e.g., an outline description of the object or a bitmap description of the object.

The updating 1210 of the pose 1211 for a particular object 1201 can be performed by applying various operations to the object including a rigid body transformation, a free-form deformation, a soft-body impact deformation, a level-set method, a particle simulation, and a change to its rendering attributes.

When rendering 1220 the object, we associate a set of sample points in the two-dimensional distance field representing the object with a component of a pixel in a frame in the sequence of frames 1221. By determining a distance from the two-dimensional distance field and the set of sample points, we can map the distance to an antialiased intensity of the component of the pixel.

In a preferred embodiment, we partition the two-dimensional distance field representing the object 1201 into cells, each cell including a method for reconstructing the two-dimensional distance field within the cell. To render 1220 in this instance, we identify a set of cells of the two-dimensional distance field representing the object 1201 that contains a region of the two-dimensional distance field to be rendered and locate a set of pixels associated with the region. A set of components for each pixel in the set of pixels is specified. A distance for each component of the pixel is determined from the set of cells and the distance is mapped to the antialiased intensity of the component of the pixel to determine an antialiased intensity for each component of each pixel in the set of pixels.

Distance-based Automatic Hinting

Hinting in standard font representations is a time-consuming manual process in which a type designer and hinting specialist generate a set of rules for better fitting individual glyphs to the pixel grid. Good hinting produces glyphs at small type sizes that are well spaced, have good contrast, and are uniform in appearance.

These rules provide: vertical stems with the same contrast distribution, with the left and bottom edges having the sharpest possible contrast; diagonal bars and thin, rounded parts of glyphs to have sufficient contrast for transmitting visual structure to the eye; and serifs that hold together and provide enough emphasis to be captured by the human eye, see Hersch et al., "Perceptually Tuned Generation of Grayscale Fonts," *IEEE CG&A*, November, pp. 78–89, 1995.

Note that prior art filtering methods produce fuzzy characters and assign different contrast profiles to different character parts, thus violating important rules of type design. To overcome these limitations, hints are developed for each glyph of each font. There are numerous problems with prior art hinting methods: they are labor intensive to develop, slow to render, and complex thus precluding hardware implementations.

For outline-based fonts, rendering with hints is a three step process. First, the glyph's outlines are scaled and aligned to the pixel grid. Second, the outlines are modified to control contrast of stems, bars, and serifs and to increase the thickness of very thin sections and arcs. Third, the modified outlines are supersampled followed by downsampling with filtering.

Although our unhinted distance-based antialiasing rendering methods described above compare favorably with prior art font rendering method that use hinting, it is known that perceptual hinting can improve reading comfort at small type sizes.

Figure 8:
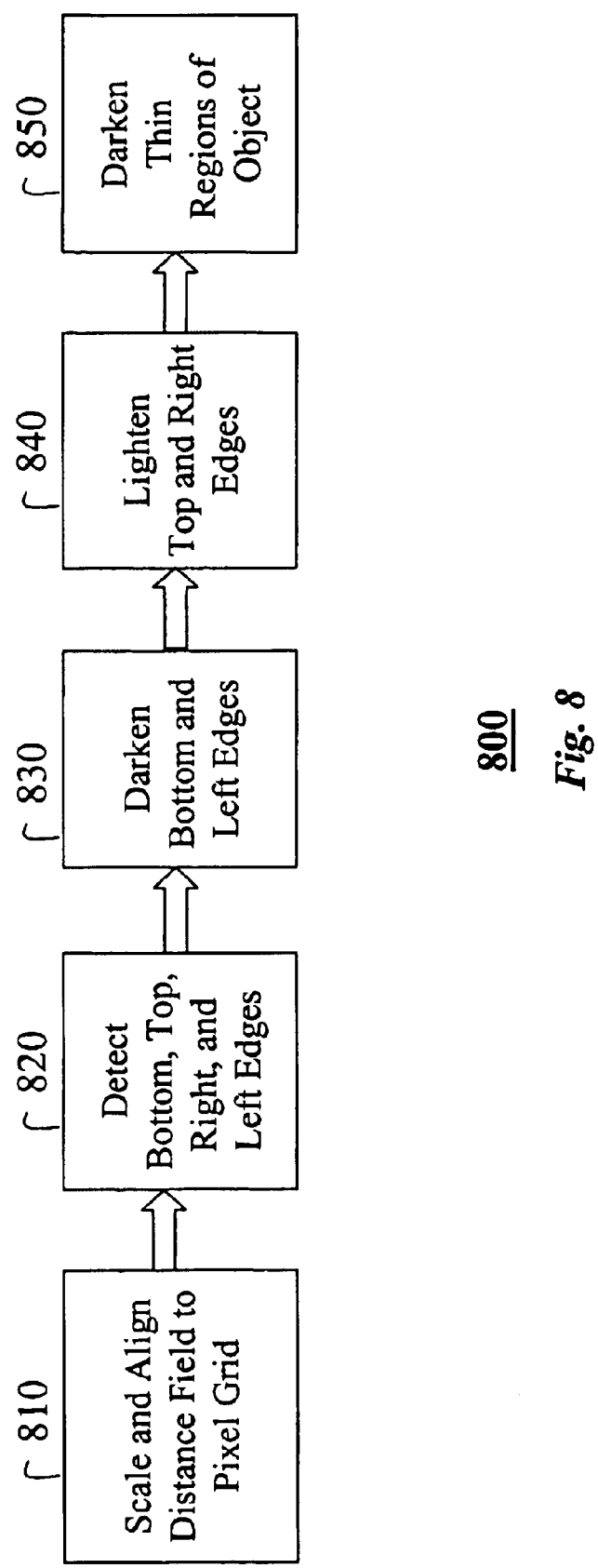
FIG. 8 is a flow diagram of a method for distance-based automatic hinting according to the invention.

Therefore, as shown in FIG. 8, we exploit the distance field to provide distance-based automatic hinting 800 for rendering glyphs at small point sizes. The first step 810 in hinting is to scale and align the distance field to the pixel or pixel component grid. This can be done automatically from the given or derived font metrics, e.g., the cap-height, the x-height, and the position of the baseline. Font metrics can be derived automatically from the distance field by using a gradient of the distance field to detect specific font metrics, such as the cap-height. The step 810 can include a general transformation of the distance field, e.g., a deformation, to enable a proper alignment to the pixel or pixel component grid.

After applying this form of grid fitting, we use the distance field and its gradient field to provide perceptual hints.

In one embodiment, the direction of the gradient of the distance field is used to detect 820 pixels on the left and bottom edges of the object. By darkening 830 these pixels and lightening 840 pixels on opposite edges, we achieve higher contrast on left and bottom edges without changing the apparent stroke weight. This can be done by decreasing and increasing the corresponding pixel intensities.

In another embodiment, the gradient field is used to provide better contrast for diagonal stems and thin arcs. We note that when a pixel is located on or near thin regions of the glyph, neighbors on either side of the pixel have opposite gradient directions, i.e., their dot products are negative. By detecting abrupt changes in gradient directions, we can darken 850 pixels on these thin regions.

These are only two examples of how the distance field can be used to provide perceptual hints automatically. The distance field can also be used to provide optimal character spacing and uniform stroke weight.

Typesetting Glyphs

Typesetting determines positions of glyphs given input data such as a layout, a starting position of the layout, and associated font metrics for the glyphs such as set-widths and kerning pairs. We define an escapement of a glyph as an offset, e.g., a vector, to a next glyph; the escapement typically includes a set-width of the glyph, the set-width and a kerning value, or numerous other combinations specified by a user, dictated by the layout, or derived from the font metrics. The escapement takes into consideration typesetting on lines, Bezier curves, or other complex paths specified by the layout. "*TEX and METAFONT: New Directions in Typesetting*" provides a good overview of typesetting.

Typical applications of typesetting include determining positions of letters in a word and determining line-breaks of a paragraph. Typesetting considers the underlying representation of the glyphs when determining their positions. For example, bitmap fonts cannot be positioned to a fraction of a pixel, whereas outline fonts can. Outline fonts are often hinted, which results in adjustments to the positions of the glyphs.

Typesetting Glyphs Represented as Two-Dimensional Distance Fields

There are numerous ways to typeset glyphs represented as two-dimensional distance fields.

In one embodiment, we turn off distance-based automatic hinting to enable an exact placement of glyph positions as dictated by a typesetting method.

In another embodiment, we use distance-based automatic hinting to grid fit, i.e., align, a distance field representing each glyph to a pixel grid, thus approximating the placement of glyph positions, as dictated by the typesetting method, to a fraction of a pixel.

In another embodiment, to achieve greater accuracy, we use distance-based automatic hinting to grid fit, i.e., align, a distance field representing each glyph to a component of a pixel grid, thus approximating the placement of glyph positions, as dictated by the typesetting method, to an even smaller fraction of a pixel.

In another embodiment, as shown in FIGS. 18A–18C, a method 1800 typesets a set of glyphs 1801. The set of glyphs 1801 can represent, for example, letters of a word, or letters of a document. A current glyph 1802 is selected 1805 from the set of glyphs 1801, e.g., a first letter of the word is selected. A current position 1803 is also selected 1810. The selection 1810 can be chosen by a user with an input device such as a mouse or derived from a layout for the set of glyphs 1801.

A termination condition 1804 is tested 1815, e.g., are all letters of the word typeset, and if satisfied, the method 1800 halts. If the termination condition 1804 is not satisfied 1850, then the method 1800 iterates to determine a next position 1809 of a next glyph 1806, e.g., a next letter in the word, where the next glyph 1806 is selected 1820 from the set of glyphs 1801.

After the selection 1820, the current glyph 1802 is represented 1825 as a two-dimensional distance field 1807. Then, the next position 1809 is determined 1830 using the current position 1803, an escapement 1808 of the current glyph 1802, and an alignment 1835 of the two-dimensional distance field 1807, e.g., the next position 1809 is determined as an offset of the escapement 1808 from the current position 1803 where the offset is adjusted accordingly to the alignment 1835.

Finally, the current glyph 1802 is updated 1840 to be the next glyph 1806 and the current position 1803 is updated 1845 to be the next position 1809 to prepare for the next iteration.

The alignment 1835 can be a consequence of a rendering of the current glyph 1802 or can be determined without rendering. Note that the alignment 1835 can depend on a selected iso-contour of the two-dimensional distance field 1807 because the selected iso-contour can change a size of the current glyph 1802.

In another embodiment, the next position 1809 is determined 1830 using the current position 1803, an escapement 1808 of the current glyph 1802, and a selected iso-contour of the two-dimensional distance field 1807. For example, the next position 1809 can be determined as an offset of the escapement 1808 from the current position 1803, where the offset is adjusted accordingly to the selected iso-contour.

A zero iso-contour may result in no adjustment. A negative iso-contour may result in a larger offset from the current position 1803 because the negative iso-contour increases a size of the current glyph 1802. A positive iso-contour may result in a smaller offset from the current position 1803 because the positive iso-contour decreases the size of the current glyph 1802.

Generating and Editing Fonts

There are two basic methods for designing fonts. The first is manual. There, glyphs are drawn by hand, digitized, and then outlines are fit to the digitized bitmaps. The second is by computer.

In the latter case, three types of tools are available. Direct visual tools can be used for curve manipulation. Procedural design tools construct the shape of a glyph by executing the instructions of a procedure. The procedure defines either a shape's outline and fills it, or defines a path stroked by a pen nib with numerous attributes, including a geometry and an orientation. Component-based design tools allow designers to build basic components such as stems, arcs, and other recurring shapes, and then combine the components to generate glyphs.

We use a sculpting editor to provide stroke-based design. This is the 2D counterpart to 3D carving as described in U.S. patent application Ser. No. 09/810,261, "System and Method for Sculpting Digital Models," filed on Mar. 16, 2001, incorporated herein by reference. Stroking can be done interactively or it can be scripted to emulate programmable design tools.

Curve-based design, using Bezier curve manipulation tools similar to those in Adobe Illustrator can also be used. Curve-based design can be combined with methods for converting outlines to distance fields and distance fields to outlines to provide a seamless interface between design paradigms.

Component-based design uses CSG and blending operations on the implicit distance field. This allows components to be designed separately and combined either during editing or during rendering.

We also provide a method for automatically generating ADFs from analog and digital font masters.

For component-based design, our font editor provides the ability to efficiently reflect and rotate ADFs using quadtree manipulation to model the symmetries common in glyphs. Additional features include ADF scaling, translation, and operations to combine multiple ADFs, e.g., CSG and blending.

For stroke-based design, we provide carving tools with a geometric profile to emulate pen nibs. The orientation and size of the simulated pen nib can change along the stroke to mimic calligraphy.

Figure 9:
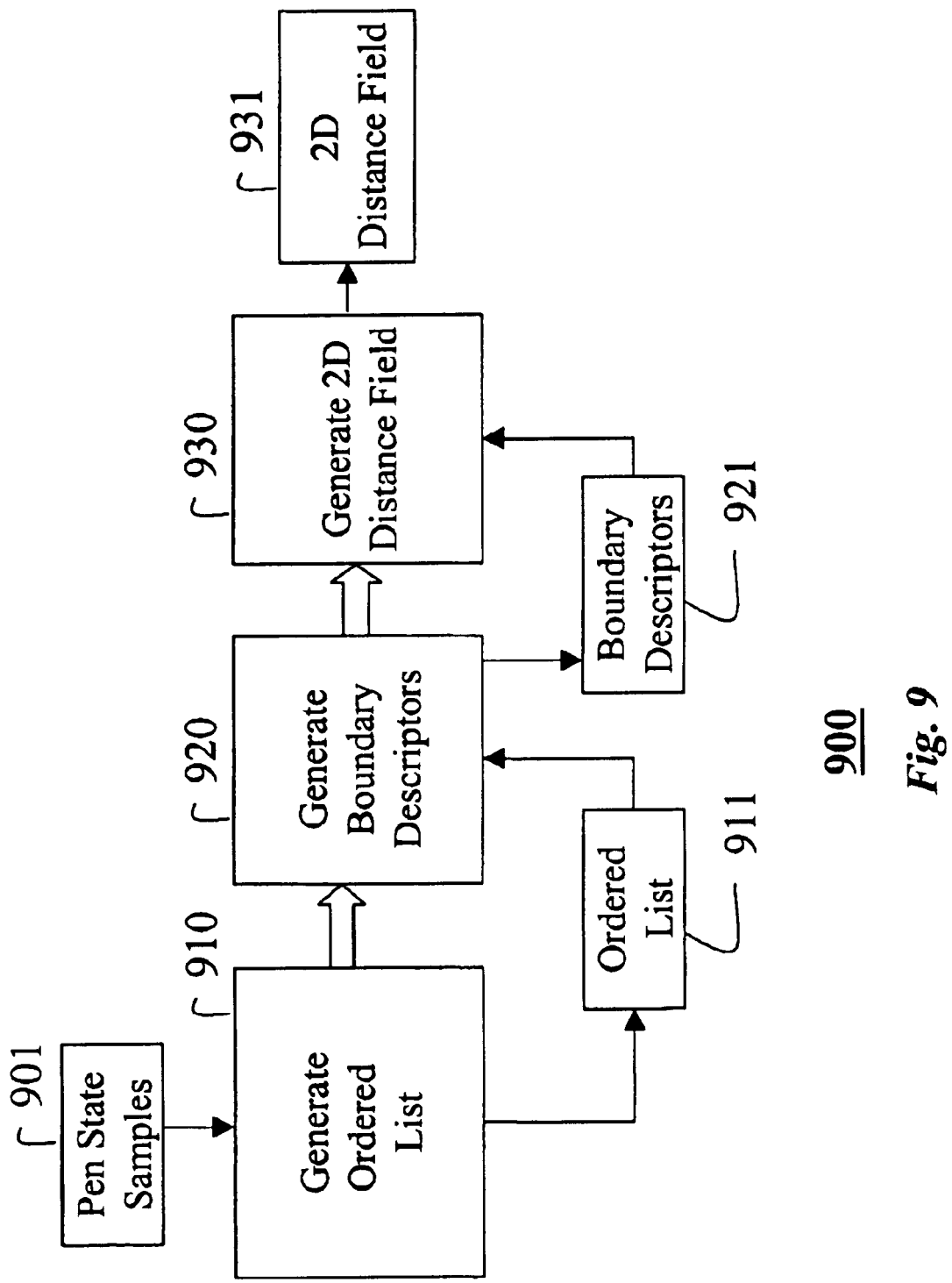
FIG. 9 is a flow diagram of a method for converting a pen stroke to a distance field according to the invention.

FIG. 9 shows a method 900 for generating a two-dimensional distance field 931 from a pen stroke. We sample a pen state during a pen stroke, the pen state comprising a location of the pen during the stroke. This pen state may also include orientation and geometry. From the pen state samples 901, we generate 910 an ordered list 911 of pen states along the pen stroke. Then, a set of boundary descriptors 921 is generated 920 from the ordered list of pen states. Finally, we generate 930 a two-dimensional distance field 931 from the set of boundary descriptors 921.

In the preferred embodiment, the boundary descriptors 921 are curves such as cubic Bezier curves.

In the preferred embodiment, we apply a curve fitting process to fit a minimum set of $G^2$ continuous curves to the path of the pen, with user-specified accuracy. We also generate two additional ordered lists of offset points from this path using the tool size and orientation, and fit curves to these offset points to generate the stroke outlines. The outline curves are placed in a spatial hierarchy for efficient processing. We generate a two-dimensional ADF from this hierarchy using a tiled generator, see U.S. patent application Ser. No. 09/810,983, filed on Mar. 16, 2001, and incorporated herein by reference.

The minimum distance to the outlines is computed efficiently using Bezier clipping. Strokes are converted to ADFs without a perceptual delay for the user. For curve manipulation, we provide a Bezier curve editor.

Figure 11:
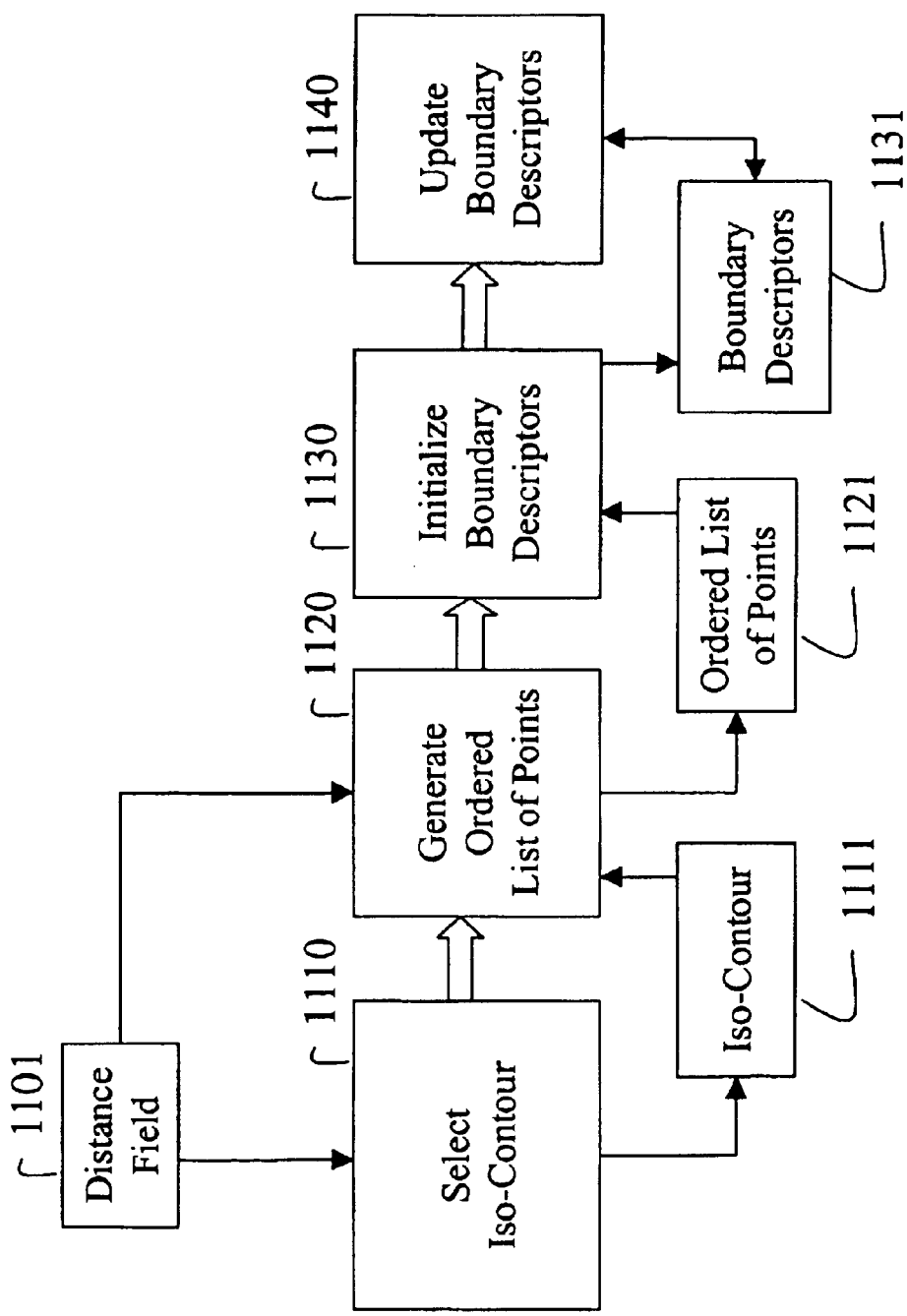
FIG. 11 is a flow diagram of a method for converting a distance field to boundary descriptors according to the invention.

As shown in FIG. 11, we also provide the ability to convert distance fields to boundary descriptors, e.g., Bezier curves, to provide a seamless interface between all three design paradigms.

In the preferred embodiment, we use bi-quadratic ADFs where this conversion traverses the leaf cells using the ADF hierarchy for fast neighbor searching, generates an ordered list of points along the zero-valued iso-contours of the ADF, and then fits curves as described with reference to FIG. 11, below, to generate the boundary descriptors.

In contrast with the prior art, where boundary descriptor errors are computed from the list of points, we compute the boundary descriptor error directly from the distance field. We pay special attention to sharp corners. Our approach is fast enough to allow users to seamlessly switch between paradigms without any noticeable delay.

FIG. 11 shows a method 1100 for converting a two-dimensional distance field 1101 to a set of boundary descriptors 1131. First, we select 1110 an iso-contour 1111 of the two-dimensional distance field 1101, e.g., distances with a zero value, or some offset.

Next, we generate 1120 an ordered list of points 1121 from the iso-contour 1111 and the two-dimensional distance field 1101. In our preferred embodiment using bi-quadratic adaptively sampled distance fields, this step visits neighboring cells of the adaptively sampled distance field 1101 sequentially using a neighbor searching technique. The search technique exploits a spatial hierarchy of the adaptively sampled distance field 1101 to efficiently localize a next neighbor along the iso-contour 1111.

In another embodiment, we generate 1120 an ordered list of points 1121 by selecting boundary cells in the ADF 1101, seeding each boundary cell with a set of ordered points, and moving each point to the iso-contour 1111 of the ADF 1101 using a distance field and a gradient field of the ADF 1101.

Then, we initialize 1130 a set of boundary descriptors 1131 to fit the ordered list of points 1121. The boundary descriptors 1131 are initialized 1130 by joining adjacent points of the ordered list of points 1121 to form a set of line segments that constitute the initial boundary descriptors 1131.

In another embodiment, we initialize 1130 a set of boundary descriptors 1131 by locating corner points, subdividing the ordered list of points into segments delimited by the corner points, and determining segment boundary descriptors to fit each segment. The union of the segment boundary descriptors forms the initial boundary descriptors 1131.

Corner points can be located by measuring curvature determined from the distance field. In the preferred embodiment, where the distance field is a bi-quadratic ADF, regions of high curvature are represented by small cells in the ADF and hence corner points can be located by using ADF cell sizes.

Once the boundary descriptors 1131 are initialized 1130, the boundary descriptors 1131 are updated 1140. The updating 1140 determines an error for each boundary descriptor by reconstructing the distance field and measuring the average or maximum deviation of the boundary descriptor from the iso-contour.

The boundary descriptors 1131 are updated 1140 until the error for each boundary descriptor is acceptable, or a predetermined amount of time has elapsed, or a cardinality of the set of boundary descriptors 1131 is minimal.

To incorporate the existing legacy of fonts stored in non-digital form, i.e., as analog masters, or in digital form as bitmaps, i.e., as digital masters, our editing system provides a method for generating ADFs from high-resolution bi-level bitmaps.

Analog masters are first scanned to produce bi-level digital masters at a resolution at least four times higher than the target ADF resolution, e.g., a 4096×4096 digital master is adequate for today's display resolutions and display sizes. An exact Euclidean distance transform is then applied to the bitmap to generate a regularly sampled distance field representing the glyph.

Then, we generate an ADF from this regularly sampled distance field using the tiled generator. Conversion from the bitmap to the ADF requires ~10 second per glyph on a 2 GHz Pentium IV processor.

To convert from existing prior art descriptors of glyphs to distance fields where the glyphs are described with a set of boundary descriptors, we apply the method described with reference to FIG. 10.

Generating and Rendering Component-Based Glyphs

The present invention provides methods for generating and rendering a composite glyph. Unlike prior art methods, which represent components, i.e., elements, by outline descriptors or stroked skeletons and either combine the elements into a single shape descriptor prior to rendering or rasterize each element and combine antialiased intensities or coverage values, the present invention represents elements of the composite glyph as two-dimensional distance fields and renders the composite glyph using these two-dimensional distance fields.

In a preferred embodiment, the rendering combines distances determined for a component of a pixel using the two-dimensional distance fields and then maps a combined distance to an antialiased intensity for the component of the pixel. By combining distance values rather than antialiased intensities or coverage values, the present invention mitigates color artifacts and blending artifacts exhibited by the prior art.

Unlike the prior methods of Perry et al., the present invention does not generate a combined distance field to represent the composite glyph prior to rendering. Instead, according to our invention, the combined distance associated with the component of the pixel is determined on-demand during rendering by combining distances determined from each element.

FIGS. 19A and 19B show a method 1900 for generating a composite glyph 1911 and rendering a region 1941 of the composite glyph 1911 in image order, producing a rendered region 1943. The composite glyph 1911 is first defined 1910 by a set of elements 1901. A set of two-dimensional distance fields 1930 is then generated 1920 using the set of elements 1901 such that the composite glyph 1911 is represented by a composition of distance fields 1931–1933 in the set of two-dimensional distance fields 1930. The region 1941 of the composite glyph 1911 is rendered 1940 using the set of two-dimensional distance fields 1930.

Figure 19C:
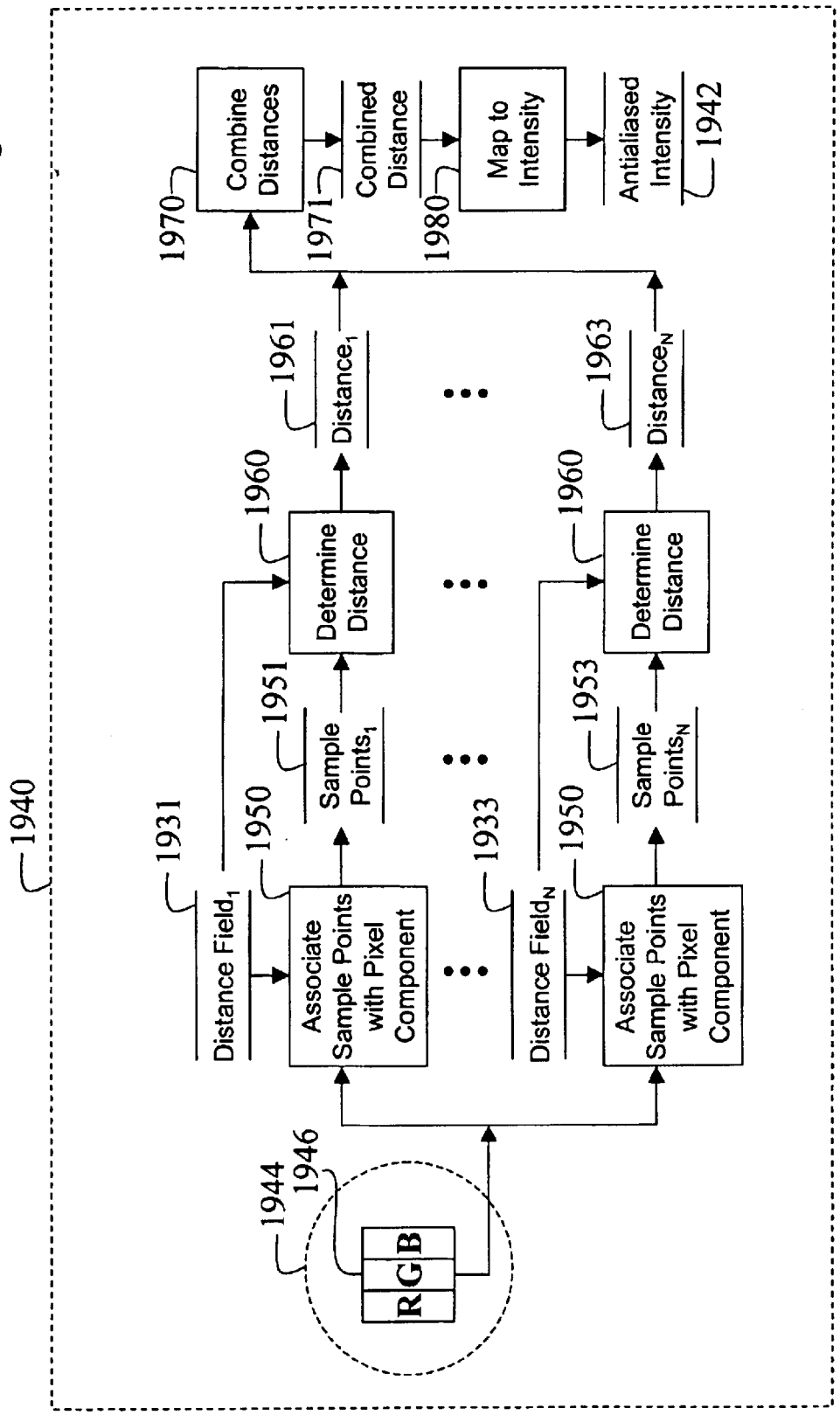
FIG. 19 is a flow diagram of a method for generating a composite glyph and rendering a region of the composite glyph in image-order according to the invention.

FIG. 19C shows a preferred embodiment for the rendering 1940 of the method 1900. Each pixel 1944 in the region 1941 can include one or more components 1946, typically a red, green, and blue component for RGB rendering. The rendering 1940 determines, for each component 1946 of each pixel 1944 in the region 1941, an antialiased intensity 1942.

Sets of sample points 1951–1953 are associated 1950 with the pixel component 1946, there being a one-to-one correspondence between each set of sample points and each distance field in the set of two-dimensional distance fields 1930. For example, the set of sample points 1951 corresponds to the distance field 1931 and the set of sample points 1953 corresponds to the distance field 1933.

A corresponding distance is then determined 1960 for each distance field 1931–1933 using its corresponding set of sample points 1951–1953, producing corresponding distances 1961–1963. For example, the corresponding distance 1961 is determined 1960 for the distance field 1931 using its corresponding set of sample points 1951.

The corresponding distances 1961–1963 are then combined 1970 to determine a combined distance 1971. The combined distance 1971 is then mapped 1980 to determine the antialiased intensity 1942 of the component 1946 of the pixel 1944.

FIGS. 20A and 20B show a method 2000 for generating a composite glyph 2006 and rendering a region 2036 of the composite glyph 2006 in object order, producing a rendered region 2037. The composite glyph 2006 is first defined 2005 by a set of elements 2001. A set of two-dimensional distance fields 2020 is then generated 2010 using the set of elements 2001 such that the composite glyph 2006 is represented by a composition of distance fields 2021–2023 in the set of two-dimensional distance fields 2020.

Each distance field 2021–2023 in the set of two-dimensional distance fields 2020 is partitioned 2025 into cells, where each cell is associated 2030 with a method for reconstructing 2031 the two-dimensional distance field within the cell. The region 2036 of the composite glyph 2006 is then rendered 2035 using the set of two-dimensional distance fields 2020.

Figure 20C:
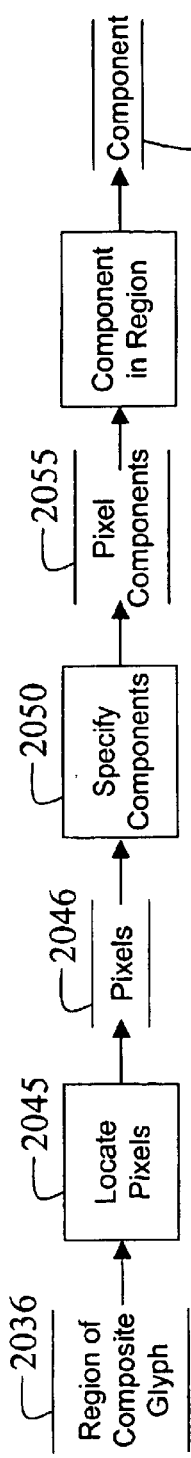
FIG. 20 is a flow diagram of a method for generating a composite glyph and rendering a region of the composite glyph in object-order according to the invention.
Figure 20D:
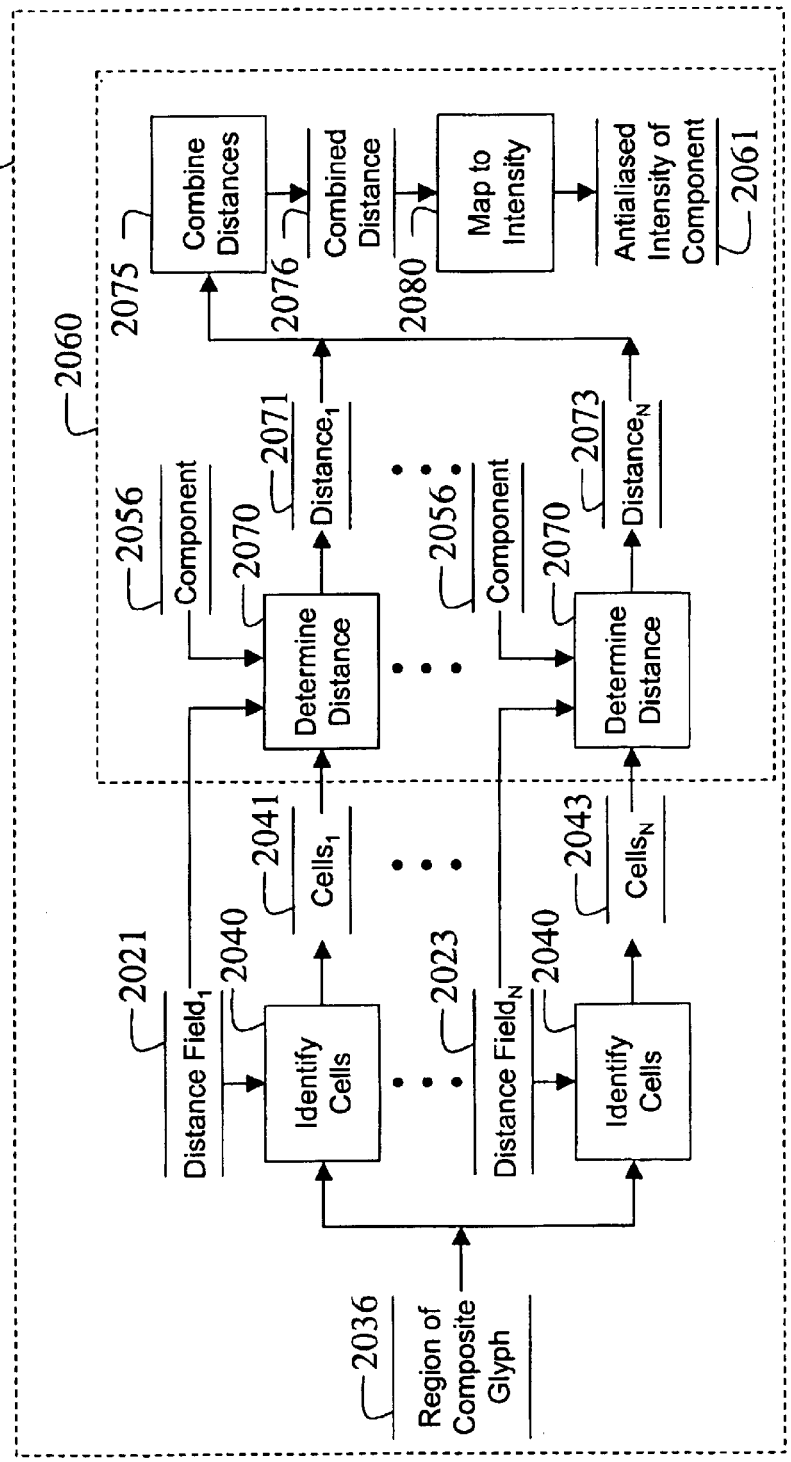

FIGS. 20C and 20D show a preferred embodiment for the rendering 2035 of the method 2000. To render the region 2036 of the composite glyph 2006, a set of pixels 2046 is located 2045 from the region 2036 and a set of components 2055 for each pixel in the set of pixels 2046 is specified 2050. Note that each pixel in the set of pixels 2046 can include one or more components, typically a red, green, and blue component for RGB rendering. The rendering 2035 determines an antialiased intensity 2061 for each component 2056 of each pixel in the set of pixels 2046.

For each two-dimensional distance field 2021–2023 in the set of two-dimensional distance fields 2020 described with respect to FIG. 20B, a corresponding set of cells 2041–2043 associated with the region 2036 is identified 2040, e.g., the set of cells 2041 is identified 2040 for the distance field 2021 and the set of cells 2043 is identified 2040 for the distance field 2023.

For each component 2056 of each pixel in the set of pixels 2046, an antialiased intensity 2061 is determined 2060 by first determining 2070, for the component 2056, a corresponding distance 2071–2073 for each distance field 2021–2023 using the corresponding set of cells 2041–2043. For example, the corresponding distance 2071 is determined 2070 for the component 2056 for the distance field 2021 using the set of cells 2041.

The corresponding distances 2071–2073 are then combined 2075 to determine a combined distance 2076. The combined distance 2076 is then mapped 2080 to produce the antialiased intensity 2061 of the component 2056 of the pixel.

The elements 1901 of the composite glyph 1911 of the method 1900 and the elements 2001 of the composite glyph 2006 of the method 2000 can have many representations. For example, they can be represented by one-dimensional and two-dimensional shape descriptors such as strokes, outlines, radicals, stroked radicals, paths, and user-drawn curves, strokes, and paths. An element can be represented by a distance field such as a distance map, an adaptively sampled distance field, a procedure for generating distance and a distance function. An element itself can be a composition such as an implicit blend of a first shape descriptor and a second shape descriptor or a skeleton with an offset descriptor.

The elements 1901 can be defined 1910 and the elements 2001 can be defined 2005 using a number of approaches. For example, the defining can be performed automatically using a procedure such as automatic shape detection, shape matching, and skeletonization. The defining can be performed interactively by a user or semi-automatically with a user guiding a procedure for defining the elements.

The defining 1910 and 2005 can be performed from a distance field representing the composite glyph. For example, the elements can be defined by performing distance-based automatic shape detection, shape matching, and skeletonization on the distance field. In addition, the defining can first determine a shape descriptor for an element and then determine a distance function for the shape descriptor to define the element.

A distance field in the sets of two-dimensional distance fields 1930 and 2020 can be represented as an adaptively sampled distance field, a set of distances stored in memory, or by a procedure, to name but a few.

Several approaches can be used for combining 1970 the corresponding distances 1961–1963 in the method 1900 and for combining 2075 the corresponding distances 2071–2073 in the method 2000. For example, using a positive-inside, negative-outside sign convention for the distance fields, the combining can take a maximum of the corresponding distances to produce a union of the objects or a minimum of the corresponding distances to produce an intersection of the objects.

Other combining methods include taking a difference, performing an arithmetic average, or performing an implicit blend of the corresponding distances, to name but a few. An implicit blend can be used to round corners between the objects while an arithmetic average can be used to provide additional antialiasing by further reducing high frequency content in the rendered region. More generally, the combining can be any arithmetic or conditional operation. Furthermore, the combining can use a procedure or a table to determine the combined distance.

Computational Substrate for Kinetic Typography

The distance field and the spatial hierarchy attributes of our ADF glyph framework can also be used for computer simulation of 2D objects, e.g., glyphs, corporate logos, or any 2D shape. For example, both attributes can be used in collision detection and avoidance, for computing forces between interpenetrating bodies, and for modeling soft body deformation.

Level set methods, which use signed distance fields, can be used to model numerous effects such as melting and fluid dynamics. ADFs are a compact implicit representation that can be efficiently queried to compute distance values and gradients, two important computations required for the methods listed above.

In contrast, determining distance values and gradients from outlines that are moving or deforming is impractical in software for real-time interaction, see Hoff et al., "Fast and Simple 2D Geometric Proximity Queries Using Graphics Hardware," *Proc. Interactive 3D Graphics'01*, 2001. Hoff et al. use graphics hardware to generate a regularly sampled 2D distance field on the fly for deforming curves approximated by line segments.

The implicit nature of the distance field permits complex topological changes, such as surface offsets that would be difficult to model with outline-based fonts. In addition, distance fields can be used to provide non-photorealistic rendering of an animated object to add artistic effect.

Effect of the Invention

The invention provides a novel framework for representing, rendering, editing, processing, and animating character glyphs, corporate logos, or any two-dimensional object.

In a preferred embodiment, the invention uses distance fields to represent two-dimensional objects. The invention includes methods for generating various instantiations of distance fields, including bi-quadratic ADFs and ADFs with specialized cells. Our methods provide a significant reduction in memory requirements and a significant improvement in accuracy over the prior art.

Our distance-based antialiasing rendering methods provide better and more efficient antialiasing than the methods used in the prior art.

Our methods also provide a computational substrate for distance-based automatic hinting, for distance-based grid fitting, for generating and rendering stroke-based and radical-based composite glyphs, for typesetting glyphs, for unifying three common digital font design paradigms, and for generating a variety of special effects for kinetic typography.

Our framework provides numerous advantages: highly legible type even at very small font sizes without the use of labor intensive manual hinting; unparalleled adaptability for flat panel display technologies, such as OLEDs, with numerous and sometimes complex arrangements for the components of a pixel; unique control of rendering parameters that enable interactive user tuning of type for enhanced viewing comfort and personal preference; a computationally clean rendering pipeline straightforward to implement in silicon and to implement on both fixed-function graphics, hardware and programmable graphics hardware; and support for advanced applications such as pen-based input.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for rendering a region of a distance field representing an object, wherein the distance field is partitioned into a set of cells, each cell comprising a set of distance samples and a method for reconstructing the distance field within the cell using the distance samples, comprising:

selecting a set of source cells from the set of cells of the distance field to render the region;

representing each source cell in the set of source cells as a geometric element in a world coordinate system, each geometric element associated with a texture map, the texture map comprising distance samples of the corresponding source cell;

transforming each geometric element from the world coordinate system to a pixel coordinate system;

texture mapping, using the distance samples, each geometric element to determine a distance for each component of each pixel associated with the geometric element; and mapping the distance of each component of each pixel to an antialiased intensity of the component of the pixel to render the region of the distance field representing the object.

2. The method of claim 1 wherein a particular geometric element is described by a quadrilateral.

3. The method of claim 1 wherein a particular geometric element is described by a triangle.

4. The method of claim 1 wherein a particular geometric element is described by a polygon.

5. The method of claim 1 wherein a particular geometric element is described by a set of control vertices.

6. The method of claim 1 wherein the transforming is performed by a central processing unit.

7. The method of claim 1 wherein the transforming is performed by a graphics processing unit.

8. The method of claim 1 wherein the transforming is performed by a vertex shader.

9. The method of claim 1 wherein the texture mapping performs bi-linear interpolation.

10. The method of claim 1 wherein the texture mapping performs tri-linear interpolation and the distance samples are stored in a mipmap.

11. The method of claim 1 wherein the texture mapping performs bi-quadratic interpolation.

12. The method of claim 1 wherein the texture mapping performs high-order interpolation.

13. The method of claim 1 wherein the texture mapping approximates the distance of each component of each pixel.

14. The method of claim 1 wherein the texture mapping determines the distance of each component of each pixel exactly.

15. The method of claim 1 wherein the texture mapping determines the distance of each component of each pixel concurrently.

16. The method of claim 1 wherein the texture mapping determines the distance of each component of each pixel independently.

17. The method of claim 1 wherein the texture mapping uses a pixel shader.

18. The method of claim 1 wherein the mapping the distance uses one-dimensional texture mapping.

19. The method of claim 1 wherein the mapping the distance uses a lookup table.

20. The method of claim 1 wherein the mapping the distance uses a pixel shader.

21. A method for rendering a region of a set of distance fields representing a corresponding set of objects, wherein each distance field in the set of distance fields is partitioned into a set of cells, each cell comprising a set of distance samples and a method for reconstructing the corresponding distance field within the cell using the distance samples, comprising:

selecting, for each distance field in the set of distance fields, a set of source cells from the set of cells of the distance field to render the region;

representing, for each distance field in the set of distance fields, each source cell in the corresponding set of source cells as a geometric element in a world coordinate system, each geometric element associated with a texture map, the texture map comprising distance samples of the corresponding source cell;

transforming each geometric element from the world coordinate system to a pixel coordinate system;

texture mapping, using the distance samples, each geometric element to determine a distance for each component of each pixel associated with the geometric element;

combining the distances for each component of each pixel to determine a combined distance; and mapping the combined distance of each component of each pixel to an antialiased intensity of the component of the pixel to render the region of the set of distance fields representing the corresponding set of objects.

22. The method of claim 21 wherein the combining performs a maximum of the distances to determine the combined distance.

23. The method of claim 21 wherein the combining performs an arithmetic average of the distances to determine the combined distance.

24. The method of claim 21 wherein the combining performs a union of the distances to determine the combined distance.

25. The method of claim 21 wherein the combining performs an intersection of the distances to determine the combined distance.

26. The method of claim 21 wherein the combining performs a difference of the distances to determine the combined distance.

27. The method of claim 21 wherein the combining performs an implicit blend of the distances to determine the combined distance.

28. The method of claim 21 wherein the combining performs an arithmetic operation on the distances to determine the combined distance.

29. The method of claim 21 wherein the combining performs a conditional operation on the distances to determine the combined distance.

30. The method of claim 21 wherein the combining uses a procedure to determine the combined distance.

31. The method of claim 21 wherein the combining uses a table to determine the combined distance.

32. The method of claim 21 wherein the combining uses a pixel shader.

33. An apparatus for rendering a region of a set of distance fields representing a corresponding set of objects, wherein each distance field in the set of distance fields is partitioned into a set of cells, each cell comprising a set of distance samples and a method for reconstructing the corresponding distance field within the cell using the distance samples, comprising:

means for selecting, for each distance field in the set of distance fields, a set of source cells from the set of cells of the distance field to render the region;

means for representing, for each distance field in the set of distance fields, each source cell in the corresponding set of source cells as a geometric element in a world coordinate system, each geometric element associated with a texture map, the texture map comprising distance samples of the corresponding source cell;

means for transforming, using a first graphics hardware component, each geometric element from the world coordinate system to a pixel coordinate system;

means for texture mapping, using a second graphics hardware component and the distance samples, each geometric element to determine a distance for each component of each pixel associated with the geometric element;

means for combining, using a third graphics hardware component, the distances for each component of each pixel to determine a combined distance; and means for mapping, using a fourth graphics hardware component, the combined distance of each component of each pixel to an antialiased intensity of the component of the pixel to render the region of the set of distance fields representing the corresponding set of objects.

34. The apparatus of claim 33 wherein the first graphics hardware component is a central processing unit.

35. The apparatus of claim 33 wherein the first graphics hardware component is a graphics processing unit.

36. The apparatus of claim 33 wherein the first graphics hardware component is a graphics processing unit using a vertex shader.

37. The apparatus of claim 33 wherein the second graphics hardware component is a texturing unit.

38. The apparatus of claim 33 wherein the second graphics hardware component comprises multiple texturing units.

39. The apparatus of claim 33 wherein the second graphics hardware component is a texturing unit using a pixel shader.

40. The apparatus of claim 33 wherein the third graphics hardware component is a texturing unit.

41. The apparatus of claim 33 wherein the third graphics hardware component is a texturing unit using a pixel shader.

42. The apparatus of claim 33 wherein the third graphics hardware component is a frame buffer.

43. The apparatus of claim 33 wherein the third graphics hardware component is an auxiliary buffer.

44. The apparatus of claim 33 wherein the fourth graphics hardware component is a texturing unit.

45. The apparatus of claim 33 wherein the fourth graphics hardware component is a texturing unit using a pixel shader.

* * * * *